(12) United States Patent
Connor et al.

(10) Patent No.: US 11,061,738 B2
(45) Date of Patent: Jul. 13, 2021

(54) METHODS AND APPARATUS TO STORE AND ACCESS MULTI DIMENSIONAL DATA

(71) Applicant: Movidius LTD, Schiphol-Rijk (NL)

(72) Inventors: Fergal Connor, Dundalk (IE); David Bernard, Kilcullen (IE); Niall Hanrahan, Galway (IE); Derek Harnett, Dublin (IE)

(73) Assignee: Movidius Limited, Schiphol-Rijk (NL)

( * ) Notice: Subject to any disclaimer, the term of this patent is extended or adjusted under 35 U.S.C. 154(b) by 101 days.

(21) Appl. No.: 16/289,150

(22) Filed: Feb. 28, 2019

(65) Prior Publication Data

US 2020/0278888 A1     Sep. 3, 2020

(51) Int. Cl.
G06F 9/30       (2018.01)
G06F 9/50       (2006.01)
G06F 17/16      (2006.01)

(52) U.S. Cl.
CPC ........ *G06F 9/5077* (2013.01); *G06F 9/30036* (2013.01); *G06F 9/5016* (2013.01); *G06F 17/16* (2013.01)

(58) Field of Classification Search
CPC .... G06F 17/16; G06F 16/901; G06F 2212/22; G06F 3/0629; G06F 3/0647; G06F 9/3895; G06F 9/5077; G06F 9/30036; G06F 9/5016
See application file for complete search history.

(56) References Cited

U.S. PATENT DOCUMENTS

| | | | | |
|---|---|---|---|---|
| 2011/0304608 A1* | 12/2011 | Yang | ..................... | G06T 15/005 345/419 |
| 2016/0085291 A1* | 3/2016 | Ebsen | ................... | G06F 1/3268 713/320 |
| 2017/0316312 A1* | 11/2017 | Goyal | ....................... | G06F 7/48 |
| 2019/0042237 A1* | 2/2019 | Azizi | ................... | G06F 9/3001 |
| 2019/0121889 A1* | 4/2019 | Gold | ....................... | G06F 3/061 |
| 2020/0151571 A1* | 5/2020 | Wu | ......................... | G06N 3/084 |
| 2020/0159810 A1* | 5/2020 | Ghosh | ..................... | G06N 3/08 |

OTHER PUBLICATIONS

Nikipedia, "Row- and column-major order," from https://en.wikipedia.org/wiki/Row-_and_column-major_order, page last edited May 14, 2019, 6 pages.

Virtual Lab in Image Processing, "Neighbourhood Operations: Theory," from cse19-iiith.vlabs.ac.in/theory.php?exp=neigh, retrieved on Jun. 17, 2019, 4 pages.

\* cited by examiner

*Primary Examiner* — Dong U Kim
(74) *Attorney, Agent, or Firm* — Hanley, Flight & Zimmerman, LLC

(57) ABSTRACT

Methods, apparatus, systems and articles of manufacture to store and access multi-dimensional data are disclosed. An example apparatus includes a memory; a memory allocator to allocate part of the memory for storage of a multi-dimensional data object; and a storage element organizer to: separate the multi-dimensional data into storage elements; store the storage elements in the memory, the stored storage elements being selectively executable; store starting memory address locations for the storage elements in an array in the memory, the array to facilitate selectable access of data of the stored elements; store a pointer for the array into the memory.

20 Claims, 13 Drawing Sheets

| SE Order Within Tensor | | | | | | |
|---|---|---|---|---|---|---|
| | ZYX | ZXY | YZX | YXZ | XYZ | XZY |
| $Z_{TSQFF}$ | 1 | 1 | $T_H/SE_H$ | $(T_H/SE_H)*(T_W/SE_W)$ | $(T_H/SE_H)*(T_W/SE_W)$ | $T_W/SE_W$ |
| $Y_{TSQFF}$ | $T_D/SE_D$ | $(T_D/SE_D)*(T_W/SE_W)$ | 1 | 1 | $T_W/SE_W$ | $(T_D/SE_D)*(T_W/SE_W)$ |
| $X_{TSQFF}$ | $(T_D/SE_D)*(T_H/SE_H)$ | $T_D/SE_D$ | $(T_D/SE_D)*(T_H/SE_H)$ | $T_H/SE_H$ | 1 | 1 |

FIG. 10A

| Activation Order Within SE | | | | | | |
|---|---|---|---|---|---|---|
| | ZYX | ZXY | YZX | YXZ | XYZ | XZY |
| $Z_{SAQFF}$ | 1 | 1 | $SE_H$ | $SE_H*SE_W$ | $SE_H*SE_W$ | $SE_W$ |
| $Y_{SAQFF}$ | $SE_D$ | $SE_D*SE_W$ | 1 | 1 | $SE_W$ | $SE_D*SE_W$ |
| $X_{SAQFF}$ | $SE_D*SE_H$ | $SE_D$ | $SE_D*SE_H$ | $SE_H$ | 1 | 1 |

FIG. 10B

| Block Order Within SE | | | | | | |
|---|---|---|---|---|---|---|
| | ZYX | ZXY | YZX | YXZ | XYZ | XZY |
| $Z_{SBQFF}$ | 1 | 1 | $SE_H/SB_H$ | $(SE_H/SB_H)*(SE_W/SB_W)$ | $(SE_H/SB_H)*(SE_W/SB_W)$ | $SE_W/SB_W$ |
| $Y_{SBQFF}$ | $SE_D/SB_D$ | $(SE_D/SB_D)*(SE_W/SB_W)$ | 1 | 1 | $SE_W/SB_W$ | $(SE_D/SB_D)*(SE_W/SB_W)$ |
| $X_{SBQFF}$ | $(SE_D/SB_D)*(SE_H/SB_H)$ | $SE_D/SB_D$ | $(SE_D/SB_D)*(SE_H/SB_H)$ | $SE_H/SB_H$ | 1 | 1 |

FIG. 10C

| Activation Order Within Block | | | | | | |
|---|---|---|---|---|---|---|
| | ZYX | ZXY | YZX | YXZ | XYZ | XZY |
| $Z_{BAQFF}$ | 1 | 1 | $SB_H$ | $SB_H*SB_W$ | $SB_H*SB_W$ | $SB_W$ |
| $Y_{BAQFF}$ | $SB_D$ | $SB_D*SB_W$ | 1 | 1 | $SB_W$ | $SB_D*SB_W$ |
| $X_{BAQFF}$ | $SB_D*SB_H$ | $SB_D$ | $SB_D*SB_H$ | $SB_H$ | 1 | 1 |

FIG. 10D

Conv(0) ←—1116

| | | [35] | ... | [17] | [16] | [15] | [14] | [13] | [12] | [11] | [10] | [9] | [8] | [7] | [6] | [5] | [4] | [3] | [2] | [1] | [0] |
|---|---|---|---|---|---|---|---|---|---|---|---|---|---|---|---|---|---|---|---|---|---|
| 1018→ | Kernel Sparsity | 0 | ... | 0 | 0 | 0 | 1 | 1 | 1 | 0 | 0 | 0 | 1 | 1 | 1 | 0 | 0 | 0 | 1 | 1 | 1 |
| 1020→ | Data Sparsity | 1 | ... | 1 | 1 | 1 | 1 | 1 | 1 | 1 | 1 | 1 | 1 | 1 | 1 | 1 | 1 | 1 | 1 | 1 | 1 |

Conv(1) ←—1122

| | | [35] | ... | [17] | [16] | [15] | [14] | [13] | [12] | [11] | [10] | [9] | [8] | [7] | [6] | [5] | [4] | [3] | [2] | [1] | [0] |
|---|---|---|---|---|---|---|---|---|---|---|---|---|---|---|---|---|---|---|---|---|---|
| 1024→ | Kernel Sparsity | 0 | ... | 0 | 0 | 1 | 1 | 1 | 0 | 0 | 0 | 1 | 1 | 1 | 0 | 0 | 0 | 1 | 1 | 1 | 0 |
| 1000→ | Data Sparsity | 1 | ... | 1 | 1 | 1 | 1 | 1 | 1 | 1 | 1 | 1 | 1 | 1 | 1 | 1 | 1 | 1 | 1 | 1 | 1 |

METHODS AND APPARATUS TO STORE AND ACCESS MULTI DIMENSIONAL DATA

FIELD OF THE DISCLOSURE

This disclosure relates generally to processors, and, more particularly, to methods and apparatus to store and access multi-dimensional data.

BACKGROUND

Mobile devices typically include image processing capabilities that are limited by size constraints, temperature management constraints, and/or power constraints. In some examples, neural network applications use such image processing capabilities. Such neural network applications may store data in two-dimensional vectors (e.g., maps, channels, etc.). In some examples, the two-dimensional vectors may be grouped to produce a multi-dimensional (e.g., three-dimensional, four-dimensional, etc.) volume/array, referred to as a tensor. Tensors, and other multi-dimensional data structures, are typically stored in memory at addresses according to a particular order (e.g., corresponding to the dimensions of the multi-dimensional data structures).

BRIEF DESCRIPTION OF THE DRAWINGS

FIGS. 10A-10D illustrate example tables corresponding to offsets that may be used by the example data storage manager of FIGS. 2 and/or 3 to access multi-dimensional data from memory.

FIGS. 11A-11B illustrate an example data manipulation protocol that may be performed by the example data storage manager of FIGS. 2 and/or 3 based on multi-dimensional data accessed from memory.

The figures are not to scale. In general, the same reference numbers will be used throughout the drawing(s) and accompanying written description to refer to the same or like parts.

Figure 1:
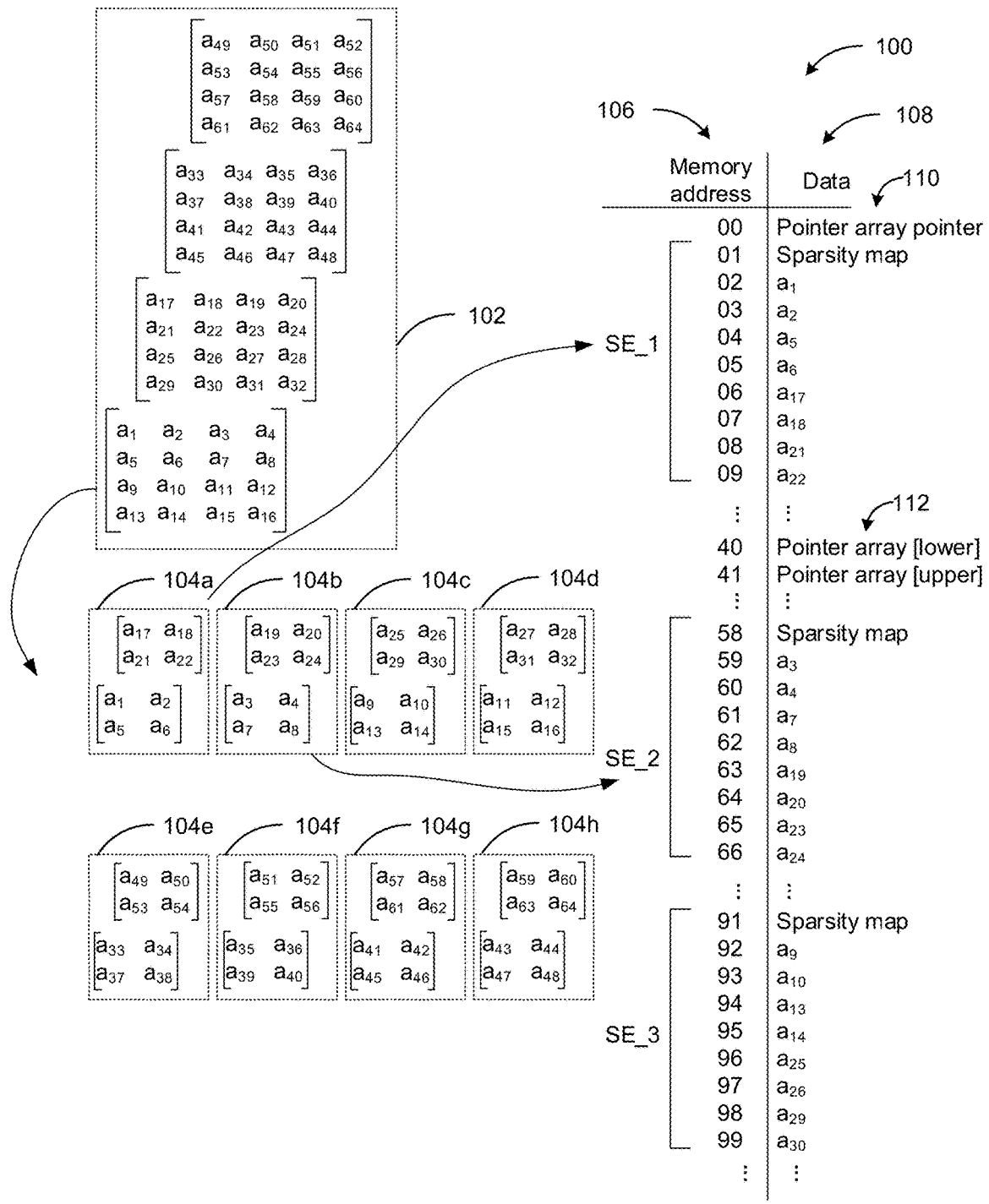
FIG. 1 is an illustration of an example tensor storage scheme in accordance with teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components

DETAILED DESCRIPTION

Computing systems, including personal computers and/or mobile devices, employ advanced image processing or computer vision to automate tasks that human vision can perform. Computer vision tasks include acquiring, processing, analyzing, and/or understanding images. Such tasks facilitate, in part, extraction of dimensional data from the digital images to produce numerical and/or symbolic information. Computer vision can use the numerical and/or symbolic information to make decisions and/or otherwise perform operations associated with three-dimensional (3-D) pose estimation, event detection, object recognition, video tracking, etc. To support augmented reality (AR), virtual reality (VR), robotics and/or other applications, performing such tasks quicker (e.g., in real time or near real time) and more efficiently results in improved image processing performance and an improved user experience.

Advanced image processing and/or computer vision sometimes employ a convolutional neural network (CNN, or ConvNet). A CNN is a neural network which may be used for various tasks such as classifying images, clustering images by similarity (e.g., a photo search), and/or performing object recognition within images using convolution. As used herein, convolution is defined to be a function derived from two given functions by integration that expresses how a shape of one of the functions is modified by a shape of the other function. Thus, a CNN can be used to identify an object (e.g., a face, an individual, a street sign, an animal, etc.) included in an input image by passing an output of one or more filters corresponding to an image feature (e.g., a horizontal line, a two-dimensional (2-D) shape, etc.) over the input image to identify one or more matches of the image feature within the input image.

CNNs obtain multi-dimensional arrays (e.g., a tensor) to be stored and/or used in computations to perform one or more functions. For example, a CNN may receive one or more multi-dimensional arrays (e.g., one or more tensors) including data corresponding to one or more images. The CNN may break the multi-dimensional arrays into vectors. For example, a CNN may break a 1,000,000-data element three-dimensional array into ten thousand vectors with one hundred data elements in each vector. Accordingly, each vector may include a large number (e.g., hundreds, thousands, ten-thousands, etc.) of data elements (e.g., activations). As used herein, the terms data element and activation are interchangeable and mean the same thing. In particular, as defined herein, a data element or an activation is a compartment of data in a data structure. Additionally, each such data element/activation may include a large number of bits. For instance, a vector with 10,000 16-bit data elements/ activations corresponds to 160,000 bits of information. Storing such vectors requires a significant amount of memory. However, such vectors may include large numbers of data elements/activations with a value of zero. Accordingly, some CNNs or other processing engines may break up such a vector into a sparse vector and a sparsity map vector (e.g., a bitmap vector).

As defined herein, a sparse object is a vector or matrix that includes all of the non-zero data elements of a dense vector in the same order as in the dense object. As defined herein, a dense object is a vector or matrix including all (both zero and non-zero) data elements. As such, the dense vector [0, 0, 5, 0, 18, 0, 4, 0] corresponds to the sparse vector [5, 18, 4]. As defined herein, a sparsity map is a vector that includes one-bit data elements identifying whether respective data elements of the dense vector are zero or non-zero. Thus, a sparsity map may map non-zero values of the dense vector to '1' and may map the zero values of the dense vector to '0'. For the above dense vector of [0, 0, 5, 0, 18, 0, 4, 0], the sparsity map may be [0, 0, 1, 0, 1, 0, 1, 0] (e.g., because the third, fifth, and eighth data elements of the dense vector are non-zero). The combination of the sparse vector and the sparsity map represents the dense vector (e.g., the dense vector could be generated and/or reconstructed based on the corresponding sparse vector and the corresponding sparsity map). Accordingly, a processor can generate and/or determine the dense vector based on the corresponding sparse vector and the corresponding sparsity map without storing the dense vector in memory.

Assuming there are sufficient zeros in the dense vector(s), storing a sparse vector and a sparsity map in memory instead of the dense vector saves memory and processing resources. For example, if each data element of the above dense vector (e.g., [0, 0, 5, 0, 18, 0, 4, 0]) corresponds to 16 bits of information, the amount of memory required to store the dense vector is 128 bits (e.g., 8 data elements X 16 bits). However, the amount of memory required to store the corresponding sparse vector (e.g., [5, 18, 4]) and the sparsity map (e.g., 0, 0, 1, 0, 1, 0, 1, 0]) is 56 bits (e.g., (3 data elements of the sparse vector X 16 bits)+(8 data elements of the sparsity map X 1 bit)). Accordingly, storing the sparse vector and sparsity map instead of a corresponding dense vector reduces the amount of memory needed to store such vectors without losing any information. Additionally, utilizing sparse vectors and sparsity maps improves bandwidth requirements because they decrease the amount of data being transferred over a data bus and/or network and, thus, increase the delivery speed to the compute engine.

Some storage schemes store multi-dimensional data (e.g., tensors, sparse vectors, etc.) contiguously into memory. However, when data is stored contiguously, a memory processing unit needs to traverse all of the stored multi-dimensional data elements to access one or more activations (e.g., the data elements of the multi-dimensional data object) of the tensor, which is time consuming and inefficient. Additionally, if some of the memory is already allocated, it may be difficult or impossible to find enough contiguous memory to store such tensors. Examples disclosed herein alleviate the inflexibility of such storage schemes and provide a flexible tensor storage protocol that promotes efficiency and facilitates parallel processing by allowing multiple processors to selectively access data from storage elements for faster storage and/or accessing of multi-dimensional data.

As used herein, an activation is a data element included in a multi-dimensional data object. As used herein, dimensions correspond to the coordinate dimensions of a multi-dimensional data object. For example, a three-dimensional data object may be defined by the three-coordinate dimensions (e.g., the X dimension, the Y dimension, and the Z dimension). Examples disclosed herein split a tensor or any other multi-dimensional data object into fixed size sub-units within which the activations are stored contiguously. For example, if a tensor is to be partitioned into three fixed-size sub-units of data, examples disclosed herein assign the first portion of the activations (e.g., one-third of the activations) of the tensor as the first sub-unit of data, the second portion (e.g., one-third) of the activations of the tensor as the second sub-unit of data, and the third portion (e.g., one-third) of the activations of the tensor as the third sub-unit of data. Each sub-unit of data is stored in a corresponding storage element (SE). The stored storage elements are selectively executable independent of each other to facilitate parallel processors to access data elements of the storage elements. For example, because the storage elements are stored in different locations of memory, and a pointer of each storage element is also stored in the memory, two processors can independently obtain data from different storage elements at the same time. The SE is a section of memory reserved for storing a sub-unit of data. Accordingly, examples disclosed herein group sub-units of the data of a tensor and store the sub units in storage elements of memory.

The SEs can be contiguous, non-contiguous, and/or a combination thereof. However, the activations within each SE are stored contiguously. A SE is a grouping of data elements stored section of the memory that corresponds to a preset coordinate dimension. For example, the SEs may store data corresponding to a three-by-three-by-three sub-unit. Additionally, if the tensor corresponds to a sparse object and/or a matrix, the SE may include a sparsity map. In this manner, the dense object may be determined from the sparse object and/or matrix and the sparsity map. Additionally, as described above, the SE includes contiguously stored activations. Additionally, the SE corresponds to a pointer of the location in memory (e.g., an address) of the first activation of the SE in memory. The pointer may be used to traverse the activations within the SE. The SE corresponds to an activation storage order. The activation order corresponds to the storage order of a multidimensional array in a linear memory. For example, when storing a three-dimensional tensor defined by the X coordinate, the Y coordinate, and the Z coordinate into memory, the string order corresponds to the order of the activations in a particular dimension. Two example storage schemes are shown in the below tables corresponding to an XYZ order and an ZXY order where (z, y, x) corresponds to the coordinate of an activation of the tensor, defined by dimensions ($T_D$, $T_H$, $T_W$).

TABLE 1

Tensor Storage In Memory Corresponding to Order XYZ

| Address Offset | Order XYZ |
|---|---|
| 0x0 | (0, 0, 0) |
| 0x1 | (0, 0, 1) |
| 0x2 | (0, 0, 2) |
| ... | ... |
| $T_W - 1$ | $(0, 0, T_W - 1)$ |
| $T_W$ | (0, 1, 0) |
| $T_W + 1$ | (0, 1, 1) |
| ... | ... |
| $(2*T_W) - 1$ | $(0, 1, T_W - 1)$ |
| $2*T_W$ | (0, 2, 0) |
| $(2*T_W) + 1$ | (0, 2, 1) |
| ... | ... |
| $(T_W*T_H) - 1$ | $(0, T_H - 1, T_W - 1)$ |
| $T_W*T_H$ | (1, 0, 0) |
| $(T_W*T_H) + 1$ | (1, 0, 1) |
| ... | ... |
| $(T_W*T_H*T_D) - 1$ | $(T_D - 1, T_H - 1, T_W - 1)$ |

TABLE 2

Tensor Storage In Memory Corresponding to Order ZXY

| Address Offset | Order ZXY |
|---|---|
| 0x0 | (0, 0, 0) |
| 0x1 | (1, 0, 0) |
| 0x2 | (2, 0, 0) |
| ... | ... |
| $T_D - 1$ | $(T_D - 1, 0, 0)$ |
| $T_D$ | (0, 0, 1) |
| $T_D + 1$ | (1, 0, 1) |
| ... | ... |
| $(2*T_D) - 1$ | $(T_D - 1, 0, 1)$ |
| $2*T_D$ | (0, 0, 2) |
| $(2*T_D) + 1$ | (1, 0, 2) |
| ... | ... |
| $(T_W*T_H) - 1$ | $(T_H - 1, 0, T_W - 1)$ |
| $T_W*T_H$ | (0, 1, 0) |
| $(T_W*T_H) + 1$ | (1, 1, 0) |
| ... | ... |
| $(T_W*T_H*T_D) - 1$ | $(T_D - 1, T_H - 1, T_W - 1)$ |

The dimension of the SE can be anything from 1×1×1 (Td (depth)*Th (height)*Tw (width)) up to the size of the tensor itself, based on user and/or manufacturer preferences. In some examples, SEs have the same dimensions.

A full tensor is stored in memory by storing each data element of the tensor in a separate, contiguously packed array in the memory. Additionally, in some examples disclosed herein, the sparsity maps are contiguously stored in another array in the memory. Additionally, examples disclosed herein utilize a predefined storage order for the pointer array (e.g., the order of dimensions in which the tensor is traversed when packing the SE pointers). Such disclosed examples pack the SE sparsity map according to the predefined storage order. Accordingly, using examples disclosed herein a tensor stored in memory may be accessed based on at least one of a pointer to the SE pointer array, a pointer to the location of the first-stored sparsity map, the inter-SE storage order (e.g., the storage order of the SEs themselves), the intra-SE storage order (e.g., the storage order of the activations within an SE), the tensor dimensions, and/or the SE dimensions.

Examples disclosed herein can access the storage location of any activation within the tensor from its coordinates by (1) calculating the coordinates of the corresponding SE within the tensor and (2) calculating the coordinates of the activation within the SE. Examples disclosed herein use the coordinates to index into the pointer array to retrieve the SE pointers and the sparsity map. Examples disclosed herein use the coordinates within the SE to calculate an address offset from the SE pointer (e.g., when the multi-dimensional data is dense and/or contains non-zero data elements), or as an index into the sparsity map from which the offset can be determined.

Because SEs may be stored non-contiguously, examples disclosed herein improve storage flexibility. Tensors can be stored in different parts of memory. This is particularly advantageous when the amount of contiguous memory available is insufficient to store an entire tensor. Additionally, because each SE is stored as a separate sub-unit corresponding to a separate pointer, examples disclosed herein facilitate parallel processing to be able to access and/or store activations from multiple different SEs at the same time using the pointer, thereby increasing the efficiency of data access and the processor using the data (e.g., avoiding processor stalls so that more clock cycles are used productively). Additionally, because the SEs may be smaller than the entire tensor (e.g., include less activations stored in less locations in the memory), the amount of time it takes for a processor to traverse through a SE is shorter than the amount of time that it takes for the processor to traverse through a full tensor.

FIG. 1 is an illustration of an example tensor storage scheme 100 in accordance with the teachings of this disclosure. The example illustration of FIG. 1 includes an example three-dimensional tensor 102, example sub-units 104a-h, example memory 106, and example data 108 stored at the addresses of the memory 106.

The example three-dimensional tensor 102 of FIG. 1 includes sixty-four activations (e.g., data elements $a_1$-$a_{64}$) stored in a four-by-four-by-four (e.g., 4-4-4) dimension tensor. As further described below in conjunction with FIG. 1, a data storage manager breaks the tensor into the example sub-units 104a-h. In the illustrated example, the sub-units 104a-h correspond to a two-by-two-by-two (e.g., 2-2-2) dimension. However, the sub-units 104a-h may be broken down into any dimensions (e.g., 2-2-4, 4-2-2, 2-4-2, 2-4-4, etc.). Once broken down, the data storage manager stores the sub-units into one or more corresponding SEs. The order of how the SEs are stored corresponds to inter-SE order. For example, in the illustrated storage scheme 100, the inter-SE order is an XYZ order, where the first SE corresponds to the first sub-unit 104a, the second SE corresponds to the second sub-unit 104b, the third SE corresponds to the third sub-unit 104c, etc. However, any inter-SE order may be used (e.g., YZX, ZYX, XZY, YXZ, ZXY). For example, in an YXZ order, the first SE will correspond to the first sub-unit 104a, the second SE will correspond to the third sub-unit 104c, the third SE will correspond to the second sub-unit 104b, the fourth SE will correspond to the fourth sub-unit 104d, etc.

The order of how the activations are stored within each SE is an intra-SE order. In the illustrated storage scheme 100, the intra-SE order is an XYZ order. For example, if the first SE $a_1$ is stored first, $a_2$ is stored second, $a_5$ is stored third, $a_6$ is stored fourth, $a_{17}$ is stored fifth, etc. However, the intra-SE order may be any order (e.g., YZX, ZYX, XZY, YXZ, ZXY). The activations within the SE are stored contiguously according to the intra-SE order. However, the SEs themselves may, or may not be stored non-contiguously. For example, the first SE and the second SE are separated by 49 memory address locations (e.g., memory address 58-memory address 09).

In the illustrated example, the tensor 102 is a sparse tensor. Thus, as further described above, the sparse tensor corresponds to a sparsity map. Accordingly, each SE includes a memory address to store a sparsity map for the corresponding activations. If the tensor 102 is not a sparse tensor, the sparsity map may be excluded. Additionally, the memory 106 includes a memory address to store an example pointer array pointer 110. An example pointer array pointer 110 is a pointer that identifies the location (e.g. memory address location) of a pointer array 112 (e.g., an array of pointers) that point to the starting location of each SE. For example, in the illustrated storage scheme 100, the pointer array pointer identifies memory address 40 which is the staring address used to store the pointer array 112 in the memory 206. The memory 106 includes one or more memory addresses (e.g., memory address 40 and 41) that store(s) the pointer array. The pointer array is an array to store the first starting memory address locations of the SEs. For example, the pointer array in the illustrated storage scheme 100 store example starting memory addresses [01, 58, 91, . . . ].

Figure 2:
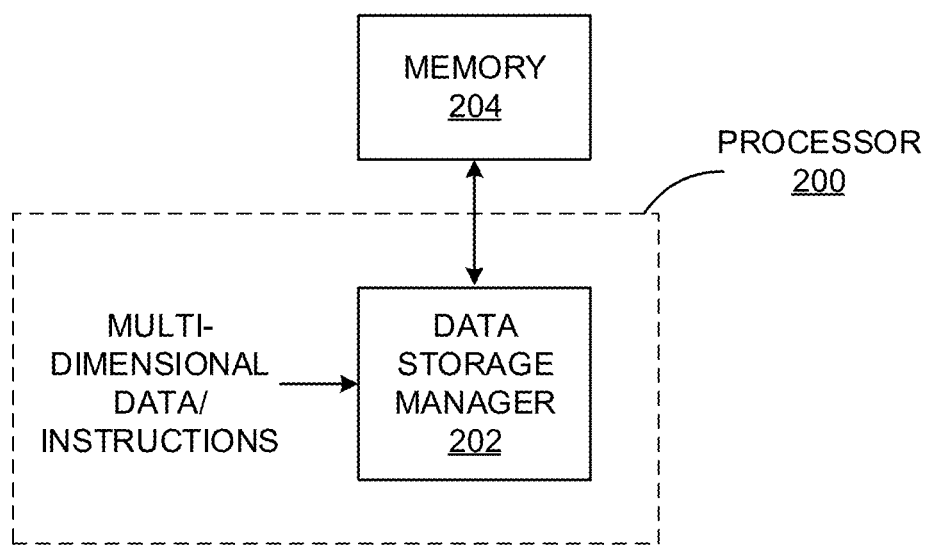
FIG. 2 is a block diagram of an example processor including a datastore manager constructed in accordance with teachings of this disclosure.

FIG. 2 is a block diagram of an example processor 200 (e.g., a convolution neural network engine). The processor 200 includes an example data storage manager 202 constructed in accordance with teachings of this disclosure to store data and access stored data from the example memory 204. The example memory 204 may correspond to the example memory 106 of FIG. 1.

The example data storage manager 202 of FIG. 2 obtains multi-dimensional data (e.g., tensors, vectors, matrices, etc.), allocates section(s) of the example memory 204 for the storage of the data, and stores the data in the allocated memory. For example, when the data storage manager 202 obtains a dense tensor (e.g., a received input from another part of the processor and/or interface), the data storage manager 202 allocates free (e.g., available) locations in the memory 204 (e.g., memory address locations in memory that are not currently storing information) to be able to store the obtained dense tensor. In some examples, the dense tensor is to be converted into a sparse object (e.g., vector or matrix) and a sparsity map (e.g., a bit map) prior to being stored (e.g., to save storage). In such examples, the data storage manager 202 allocates (e.g. partitions) some unknown amount of memory to store the sparse object and sparsity map (e.g., based on the amount of non-zero data elements in the dense tensor) because the size of the sparse object is unknown. In some examples, the data storage manager 202 allocates a preset amount of memory (e.g., less than the amount needed to store the entire dense tensor) and dynamically monitors the storage of the sparse object to allocate additional memory when needed, as further described below in conjunction with FIG. 2.

To increase the speed and efficiency of accessing stored data, the example data storage manager 202 of FIG. 2 breaks multi-dimensional data into SEs and stores the different SEs into the memory 204. In this manner, when one or more activations are called from the memory 204, instead of the data storage manager 202 traversing through the entire tensor, the data storage manager 202 can determine where the corresponding SE is stored and traverse the SE (e.g., which may be much smaller than the entire tensor), thereby increasing the speed and efficiency of the access of activations stored in the memory 204. Additionally, because it may not always be practical or desirable to store a tensor contiguously in memory (e.g., because of the characteristics of the tensor and/or memory), although the activations within the SE are contiguous, the SEs themselves may be located non-contiguously, thereby providing more flexible multi-dimensional data storage. For example, a first SE is entirely stored in a contiguous range of available memory space, but the first SE may be stored in a first memory space that is non-contiguous with a second memory space storing a second SE.

Additionally, storing multi-dimensional data as discrete SEs facilitates parallel processing. For example, the data storage manager 202 may include one or more processor(s) for accessing and/or storing data corresponding to each SE, thereby increasing the speed and efficiency of accessing and/or storing the data. The SE is defined by preset dimensions (e.g., based on user and/or manufacture preferences), a pointer to the location of the first activation of the SE in the memory 204, and a preset activation storage order (e.g., the XYZ, ZXY, YZX, etc. order of how the three-dimensional data is organized). Additionally, when the tensor stored in the SE corresponds to a sparse object, the SE includes a sparsity map for corresponding to the activations in the SE. The activation storage order corresponds to the order that the multi-dimensional data is stored in the locations (e.g., memory address or memory address location) within the memory 204.

As described above, the dimensions of the SE may be based on user and/or manufacturer preferences. Bigger or smaller SEs each have advantages and disadvantages. For example, smaller SEs access activations faster than larger SEs. Additionally, less memory can be allocated for smaller SEs when the data is sparse. However, smaller SEs have a larger overhead ratio (e.g., additional bits of the SE to the content stored in the SE) because both larger and smaller SEs must store dimensions, size, pointers, etc., but the smaller SEs, by configuration, store less data (e.g., less content) than larger SEs. Thus, the storage efficiency of larger SEs is higher than storage efficiency of smaller SEs. However, smaller SEs provide more flexibility. For example, when the memory 204 is limited, there are more options of contiguous available storage space sufficiently large enough to store smaller SEs than larger SEs. The user and/or manufacturer may select a size of the SEs based on characteristics of the processor 200 and/or memory usage to store data in a manner most consistent with the circumstances. For example processor characteristics on which SE size can be based include the structure and availability of storage space. Additionally or alternatively, memory usage characteristics on which SE size can be based include processor speed, bandwidth, etc. The example data storage manager 202 can access an activation of a SE stored in the memory 204 based on the SE dimensions and a pointer to the SE by performing a division and modulo operation, as further described below in conjunction with FIG. 2.

In some examples, the data storage manager 202 of FIG. 2 breaks the SEs into blocks (e.g., sub-units). Because the blocks of the SE are contiguous within the SE, breaking the SE into blocks narrows down the SE into a smaller size without significantly increasing the overhead. In this manner, instead or accessing the SE and traversing through the entire SE to access an activation, a processor can access the SE, then access the block within the SE (e.g., which is smaller and contains less activations than the entire SE) and traverse through the smaller block to access the activation. A user and/or manufacturer may determine whether or not to break SEs into blocks. Although breaking SEs into blocks further increases activation access speed and efficiency without the overhead required for smaller SEs by reducing the amount of addresses that a processor needs to traverse to find an activation, a block order of data may be inefficient when inputting and/or mapping a tensor. Accordingly, storing data in blocks may require extra processor resources to convert the block order back into a raster order before being input and/or mapped to a processing array. The example data storage manager 202 can access an activation in a block of a SE stored in the memory 204 based on the SE dimensions, the block dimensions, a pointer to the SE, and a division and modulo operation, as further described below in conjunction with FIG. 2.

In some examples, the example data storage manager 202 of FIG. 2 receives instructions from the processor 200 to manipulate a tensor by manipulating a pointer table and/or sparsity map. For example, when the data stored in the memory 204 is to be filtered at the edges of an image, the processor 200 may need to perform a sparse dot product and/or convolution on the stored data. The processor 200 may have tile-based pattern vectors with particular sized tiles to perform such convolutions. Accordingly, in some examples, the data storage manager 202 may convert a multi-dimensional data object into a one-dimensional vector and zero pad a sparsity map corresponding to the multi-dimensional data and/or a filter kernel (e.g., the tiles for the tile-based pattern) so that the dimensions of the sparsity map matches the particular sized tiles, thereby achieving a more efficient convolution process, as further described below.

The example memory 204 of FIG. 2 stores received multi-dimensional data (e.g., vectors, matrices, tensors, etc.) based on the operation of the example data storage manager 202. For example, the memory 204 stores each data element of a sparse vector in one or more addresses in the memory 204. In this manner, each data element of the sparse vector corresponds to the one or more memory addresses. Accordingly, when the data storage manager 202 receives instructions to access a data element of a sparse vector corresponding to a position within the sparse vector, the data storage manager 202 can access the data element at the requested position within the sparse vector based on the address where the data element is stored.

Figure 3:
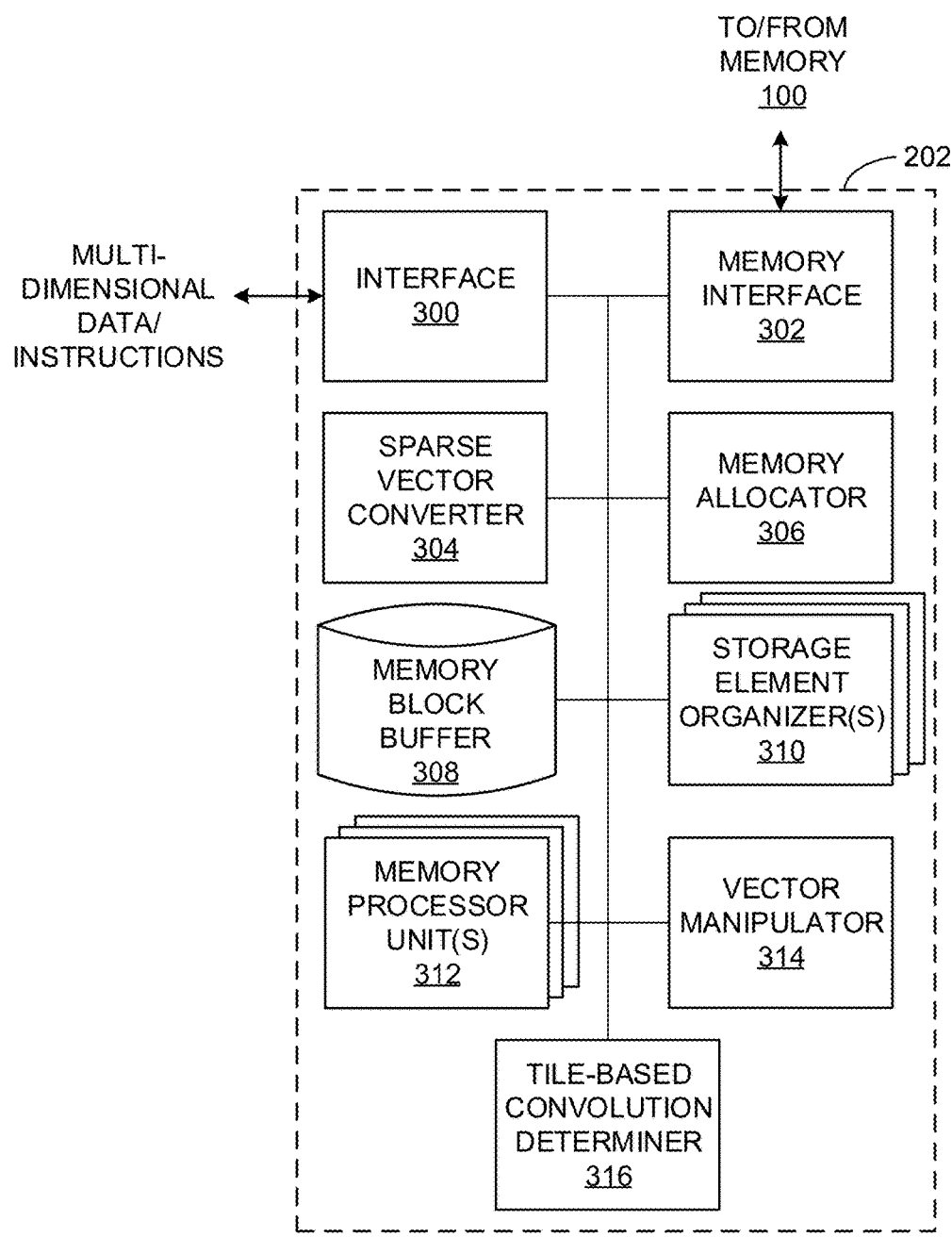
FIG. 3 is a block diagram of the data storage manager of the example processor of FIG. 2.

FIG. 3 is a block diagram of the example data storage manager 202 of FIG. 2. The example data storage manager 202 of FIG. 3 includes an example component interface 300, an example memory interface 302, an example sparse vector converter 304, an example memory allocator 306, an example memory block buffer 308, example storage organizer(s) 310, example memory processing unit(s) 312, an example vector manipulator 314, and an example tile-based convolution determiner 316.

The example component interface 300 of FIG. 3 obtains multi-dimensional data to be stored in the example memory 204 from another data element and/or application of the example processor 200 of FIG. 2. Additionally, the example component interface 300 may receive instructions from another data element of the example processor 200. The instructions may correspond to the desired size of the memory blocks used for the dynamic allocation process, the desired dimensions of the SEs, the desired dimensions of blocks within the SEs, whether the dense multi-dimensional data is to be stored as a sparse object, instructions regarding whether to manipulate an array of pointers and/or a sparsity map, etc. Additionally, the example component interface 300 may output accessed activations from the example memory 204 to another data element and/or application of the processor 200 of FIG. 2. The example memory interface 302 of FIG. 3 interfaces with the example memory 204 to store and/or access multi-dimensional data activations.

The example sparse vector converter 304 of FIG. 3 receives the dense vector(s) and converts the dense vector(s) into sparse vector(s) (e.g., a vector including only the non-zero values of the received vector) and sparsity map(s) (e.g., a bitmap identifying to which data elements of the dense vector are zero and which data elements of the vector are non-zero). For example, if the sparse vector converter 304 receives the nine-by-one dense vector [0;0;532;0;1432; 4;0;0;1], the sparse vector converter 304 converts the nine-by one-dimension dense vector into a four-by-one-dimension sparse vector (e.g., [532; 1432; 4; 1]) including the non-zero values of the dense vector and eliminating the zero values of the dense vector. The sparse vector converter 304 also generates an eight-by-one-dimension sparsity map (e.g., [0;0;1;0;1;1;0;0;1]) representing each data element of the received dense vector with a single bit identifying whether the corresponding data element is zero or non-zero (e.g., '0' when the corresponding data element of the vector is '0' and '1' when the corresponding data element of the vector is non-zero). The dense vector (e.g., a vector with both at least one zero value and at least one non-zero value) can be reconstructed from the sparse vector (e.g., a vector with only the non-zero values of the dense vector) using the sparsity map (e.g., a bitmap vector of the dense vector). However, storing a sparse vector and a sparsity map requires less memory than storing a dense vector, when the dense vector includes sufficient zero-valued data elements. For example, if each data element of the above dense vector corresponds to 16 bits, then the number of bits required to store the dense vector is 72 bits (e.g., 9 data elements X 8 bits=72 bits). However, because the corresponding sparse vector only includes 4 data elements and the corresponding sparsity map only requires one bit per data element, storing the corresponding sparse vector and sparsity map requires 41 bits (e.g., (4 data elements X 8 bits)+(9 data elements X 1 bit)=41 bits). In some examples, the dense vector(s) are obtained from another processor. In some examples, the dense vector(s) are obtained from a user via a user interface.

The example memory allocator 306 of FIG. 3 allocates space and/or locations (e.g., memory addresses) in the example memory 204 (FIG. 2) when the example component interface 300 receives multi-dimensional data to be stored in the example memory 204. When the multi-dimensional data is to be converted into a sparse object, the example memory allocator 306 allocates a preset number of memory blocks in the example memory 204. The memory blocks are a preset size (e.g., based on the user and/or manufacturer preferences) that is smaller than the fully dense multi-dimensional data. The example memory allocator 306 stores the location(s) and/or size(s) of the memory blocks in the example memory block buffer 308. As the example SE organizer(s) 310 use the allocated memory blocks to store the sparse object, the corresponding memory block data is removed from the memory block buffer 308. Accordingly, the memory allocator 306 monitors the memory block buffer 308 to allocate additional memory blocks when the number of stored memory block data is below a threshold. Additionally, the example memory allocator 306 monitors the amount of available storage in the example memory 204 while the data is being stored. If the amount of available storage is below a threshold, the example memory allocator 306 pulls an already populated memory block into long term memory (e.g., thereby freeing up short term memory to be reallocated) and updates the address of the affected SEs in a SE pointer table. When the memory allocation is complete, the example memory allocator 306 deallocates any unused memory blocks.

The example SE organizer(s) 310 of FIG. 3 stores received multi-dimensional data and/or sparse objects (e.g., generated from the multi-dimensional data) in the example memory 204 via the example memory interface 302. For example, the SE organizer(s) 310 breaks the multi-dimensional data into SEs and/or blocks of SEs. In some examples, SE organizer(s) 310 may be parallel processors to store one or more of the SEs in parallel. The example SE organizer(s) 310 additionally determines the pointer of each stored SE and stores an array of the SE pointers in the example memory 204. If the multi-dimensional data is converted into a sparse object, the example SE organizer(s) 310 additionally stores the sparsity map(s) and sparsity map pointer array corresponding to pointers for the sparsity map(s) into the example memory 204. The SE pointers facilitate selectable execution of the stored SE to access data using multiple processors in parallel.

The example memory processor unit(s) 312 of FIG. 3 access one or more activations stored in the SEs and/or blocks within SEs of the example memory 204. When there are multiple activations to access, the example memory processor unit(s) 312 may apply parallel processing to have different memory processor units selectively access different activations based on pointers of the pointer array. For example, because the storage elements are stored in different locations of memory, and a pointer of each storage element is also stored in the memory, two processors can independently obtain data from different storage elements at the same time. In some examples, the memory processor unit(s) are dedicated to one or more SEs. In such examples, when an activation belongs to one of the SE, the corresponding memory processing unit traverses the memory 204 to access the activation while other memory processor unit(s) traverse the memory 204 for other activations in other SEs. The example memory processor unit(s) 312 determines the location of the activation in the memory 204 based on the coordinate of the activation and division and/or modulo operations corresponding to the dimensions of the SEs and/or blocks within the SEs. Additionally, the example memory processor units 312 may have to account for order offsets based on the order corresponding how the SEs are structured (e.g., XYZ, ZYX, YXZ, etc.), the order of how the blocks are stored within the SEs, and/or the order of how the activations are stored within a SE of a SE and/or block. The application of the order offsets are further described below in conjunction with FIGS. 10A-10D.

Figure 11A:
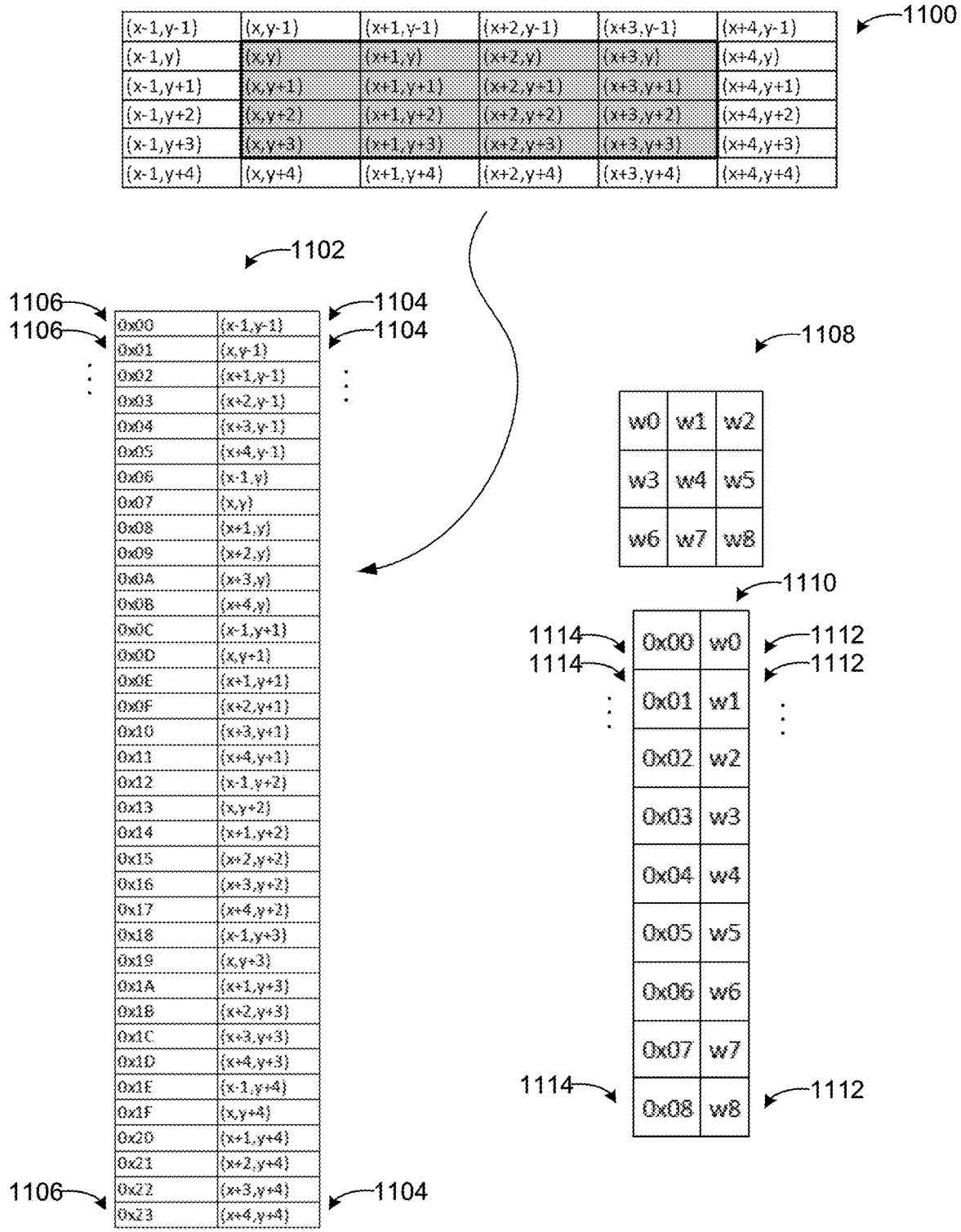

The example vector manipulator 314 of FIG. 3 manipulates accessed multi-dimensional tensors and/or filter tensors in order to increase the efficiency of post-accessing operations. For example, when multi-dimensional data is called from the example memory 204, the multi-dimensional data may be subsequently filtered using a tile-based protocol. Such tiled-based filtering corresponds to a number of weights (e.g., as part of a filter kernel) that are applied to the multi-dimensional data using convolution. Because the filters may be preset, the example vector manipulator 314 may zero pad and/or perform other manipulations to the multi-dimensional tensors and/or filter tensors to increase the efficiency of the convolution process. Conventionally, zero padding was used on the dense data itself to conform the dense data to a filter tensor. However, some convolution techniques may save processor resources by performing a convolution based on the sparsity map, which eliminates any non-zero calculations. Accordingly, in such examples, when the multi-dimensional data corresponds to a sparse object, the example vector manipulator 314 may zero-pad the sparsity map rather than the sparsity data, thereby conserving resources because sparsity maps use less memory than sparsity data. In some examples, when the multi-dimensional data corresponds to a sparse object, the vector manipulator 314 zero-pads the sparsity map of the filter tensor to match the dimensions of the sparsity map and performs the necessary convolutions based on the zero-padded filter sparsity map and the data sparsity map. An example of the manipulations performed by the example vector manipulator 314 is further described below in conjunction with FIGS. 11A-B.

The example tile-based convolution determiner 316 of FIG. 3 performs convolutions of multi-dimensional data with filters. In some examples, the tile-based convolution determiner 316 may perform sparsity-map-based convolution which processes the sparsity map of the multi-dimensional data and the sparsity map of a filter kernel (e.g., zero-padded) to identify non-zero data elements that need to be multiplied in order to complete the convolution for the filtering process.

While an example manner of implementing the example data storage manager 202 of FIG. 2 is illustrated in FIG. 3, one or more of the elements, processes and/or devices illustrated in FIG. 3 may be combined, divided, re-arranged, omitted, eliminated and/or implemented in any other way. Further, the example component interface 300, the example memory interface 304, the example memory allocator 306, the example sparse vector converter 308, the example storage organizer(s) 312, the example memory processing unit(s) 314, the example vector manipulator 314, the example tile-based convolution determiner 316, and/or, more generally, the example data storage manager 202 of FIG. 3 may be implemented by hardware, software, firmware and/or any combination of hardware, software and/or firmware. Thus, for example, any of the example component interface 300, the example memory interface 304, the example memory allocator 306, the example sparse vector converter 308, the example storage organizer(s) 312, the example memory processing unit(s) 314, the example vector manipulator 314, the example tile-based convolution determiner 316, and/or, more generally, the example data storage manager 202 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 300, the example memory interface 304, the example memory allocator 306, the example sparse vector converter 308, the example storage organizer(s) 312, the example memory processing unit(s) 314, the example vector manipulator 314, the example tile-based convolution determiner 316, and/or, more generally, the example data storage manager 202 of FIG. 3 is and/or are hereby expressly defined to include a non-transitory computer readable storage device or storage disk such as a memory, a digital versatile disk (DVD), a compact disk (CD), a Blu-ray disk, etc. including the software and/or firmware. Further still, the example data storage manager 202 of FIG. 3 may include one or more elements, processes and/or devices in addition to, or instead of, those illustrated in FIG. 3, and/or may include more than one of any or all of the illustrated elements, processes and devices.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example data storage manager 202 of FIG. 2 and/or FIG. 3 are shown in FIGS. 4-9. The machine readable instructions may be an executable program or portion(s) of an executable program for execution by a computer processor such as the processor 200 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 200, but the entire program and/or parts thereof could alternatively be executed by a device other than the processor 200 and/or embodied in firmware or dedicated hardware. Further, although the example program is described with reference to the flowcharts illustrated in FIGS. 4-9, many other methods of implementing the example data storage manager 202 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIGS. 4-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
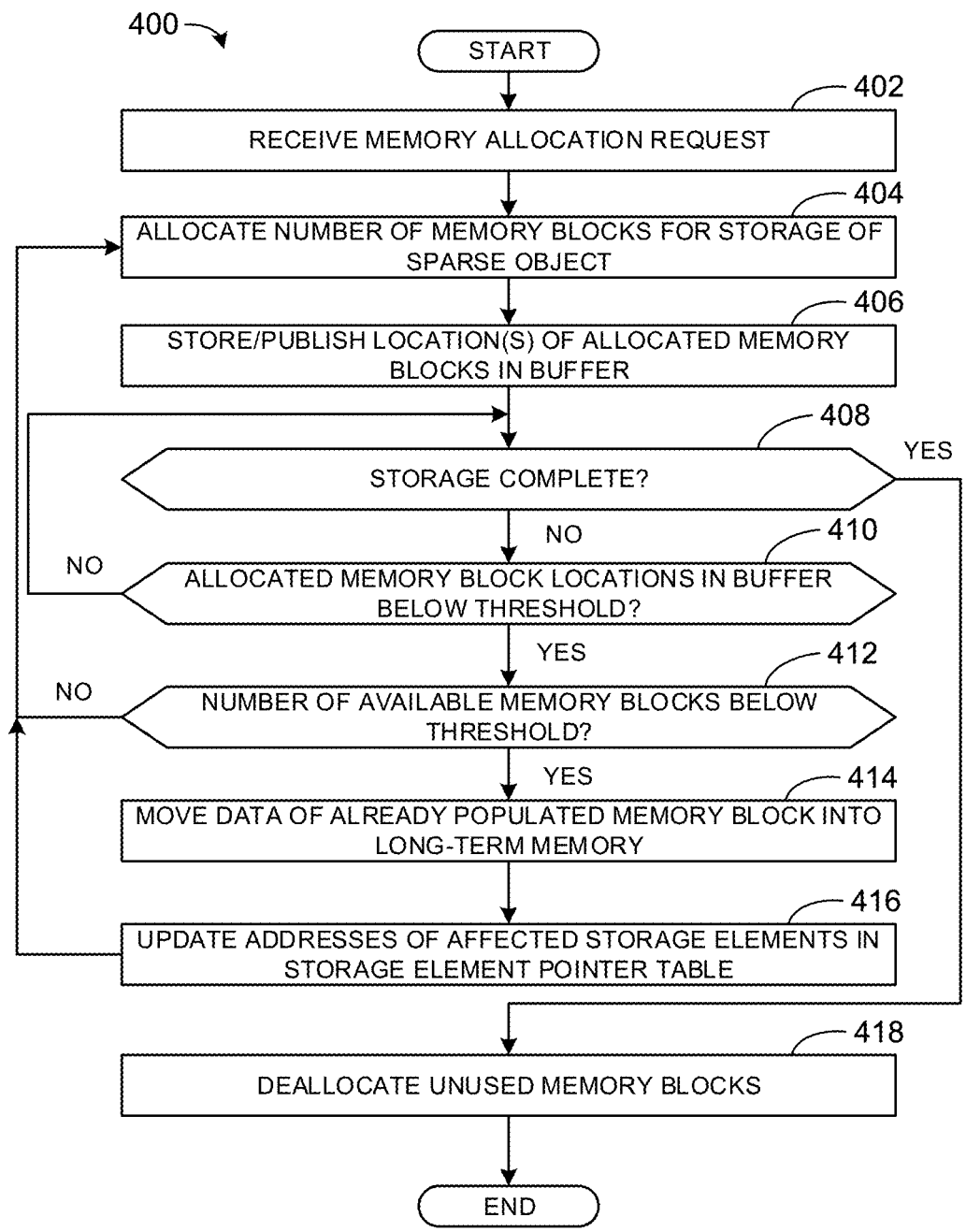
FIG. 4 is a flowchart representative of example machine readable instructions which may be executed to implement the example data storage manager of FIGS. 1 and/or 2 to allocate memory to store a sparse object.

FIG. 4 is an example flowchart 400 representative of example machine readable instructions that may be executed by the processor 200 (FIG. 2) to implement the example data storage manager 202 of FIG. 3 to allocate memory to store a sparse object (e.g., a vector or a matrix). Although the flowchart 400 of FIG. 4 is described in conjunction with the example data storage manager 202 of FIG. 3, other type(s) of data storage manager(s) and/or other type(s) of processor(s) may be utilized instead.

At block 402, the example memory allocator 306 (FIG. 3) receives a memory allocation request via the example component interface 300 (FIG. 3). The memory allocation request may correspond to obtaining multi-dimensional data to be converted into a sparse object and sparsity map and stored in the example memory 204 (FIG. 2). At block 404, the example memory allocator 306 allocates a number of memory blocks for storage of a sparse object. As described above, because the sparsity of the multi-dimensional data to be stored is not known prior to converting into a sparse object, the amount of memory that needs to be allocated to the sparse object is likewise unknown. Accordingly, the example memory allocator 306 allocates a number of memory blocks as an initial amount of memory that may be updated during the storing process as more memory blocks are needed.

At block 406, the example memory allocator 306 stores and/or publishes the memory address locations of the allocated memory blocks in the example memory block buffer 308 (FIG. 3). In this manner, one of the example SE organizer(s) 310 (FIG. 3) may pull a memory block location from the memory block buffer 308 and begin storing data at the corresponding memory address location in the memory 204. At block 408, the memory allocator 306 determines if the storage of the sparse object corresponding to the multi-dimensional data is complete (e.g., based on a trigger, flag, and/or signal from the SE organizer(s) 310). If the example memory allocator 306 determines that the storage is complete (block 408: YES), the example memory allocator 306 deallocates unused memory blocks from the example memory 204 (block 418). The example process of FIG. 4 then ends.

Returning to block 408, if the example memory allocator 306 determines that the storage is not complete (block 408: NO), the example memory allocator 306 determines if the number of allocated memory block locations in the example memory block buffer 308 is below a threshold number of memory block locations (block 410). As described above, as the SE organizer(s) 310 (FIG. 3) pull the locations out of the memory block buffer 308 to store the data. Accordingly, as the SE organizer(s) 310 pull the locations, the number of available memory block locations in the memory block buffer 308 decreases. If the example memory allocator 306 determines that the number of allocated memory block locations in the example memory block buffer 308 is not below a threshold number of memory block locations (block 410: NO), control returns to block 408. If the example memory allocator 306 determines that the number of allocated memory block locations in the example memory block buffer 308 is below a threshold number of memory block locations (block 410: YES), the example memory allocator 306 determines if the number of available memory blocks in the example memory 204 is below a threshold amount of memory (block 412). Because the amount of memory 204 is limited, as additional memory blocks are allocated, the number of available memory blocks decreases.

If the example memory allocator 306 determines that the number of available memory blocks in the example memory 204 is not below a threshold amount of memory (block 412: NO), control returns to block 404 to allocate an additional number of memory blocks. If the example memory allocator 306 determines that the number of available memory blocks in the example memory 204 is below a threshold amount of memory (block 412: YES), the example memory allocator 306 moves data of an already populated memory blocks into long-term memory (block 414) (e.g., to make space for the additional memory blocks needed in the example memory 204). At block 416, the example memory allocator 306 updates the addresses of the affected SEs in the SE pointer table stored in the example memory 204 to reflect the new location of the data in the populated memory block. The example process of FIG. 4 then ends.

Figure 5:
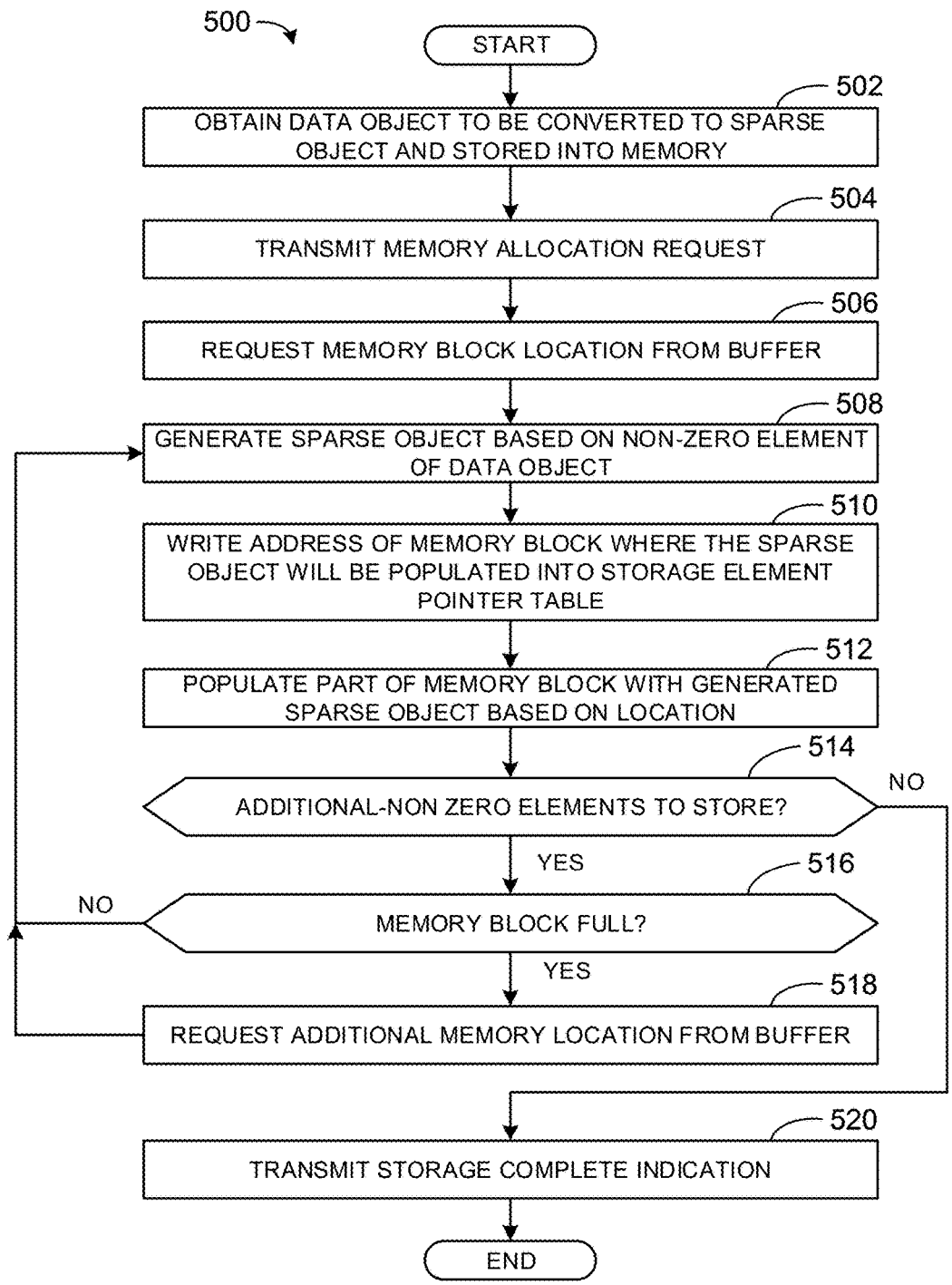
FIG. 5 is a flowchart representative of example machine readable instructions which may be executed to implement the example data storage manager of FIGS. 1 and/or 2 to store a sparse object based on allocated memory blocks.

FIG. 5 is an example flowchart 500 representative of example machine readable instructions that may be executed by the example processor 200 (FIG. 2) to implement the example the data storage manager 202 of FIG. 3 to store a sparse object (e.g., vector or matrix) based on allocated memory blocks. Although the flowchart 500 of FIG. 5 is described in conjunction with the example data storage manager 202 of FIG. 3, other type(s) of data storage manager(s) and/or other type(s) of processor(s) may be utilized instead.

At block 502, the example SE organizer(s) 310 (FIG. 3) obtain a data object (e.g., three-dimensional data) to be converted into a sparse object (e.g., a vector or a matrix) and stored into the example memory 204 (FIG. 2). At block 504, the example SE organizer(s) 310 transmit(s) a memory allocation request to the example memory allocator 306 (FIG. 3). In this manner, the example memory allocator 306 can allocate memory blocks for the storage of the sparse object, as described above in conjunction with FIG. 3.

At block 506, the example SE organizer(s) 310 request a memory block address from the example memory block buffer 308. In some examples, the SE organizer(s) 310 break(s) the sparse object into SEs to be able to store the data in parallel using multiple SE organizers 310. In such examples, the SE organizers 310 may gather memory block locations for different SEs. At block 508, the example sparse vector converter 304 generates a sparse object based on a non-zero data element of the data object. At block 510, the example SE organizer(s) 310 write(s) the address of the memory 204 (e.g., via the example memory interface 302 of FIG. 3) where the sparse object is populated into the SE pointer table in the memory 204. At block 512, the example SE organizer(s) 310 populate(s) the part of the memory block with the generated sparse object based on the requested memory block location pulled from the memory block buffer 308.

At block 514, the example sparse vector converter 304 (FIG. 3) determines if there are additional non-zero data elements to store. If the example sparse vector converter 304 determines that there are no additional non-zero data elements to store (block 514: NO), the SE organizer(s) 310 transmit(s) a storage complete indication to the example memory allocator 306 (block 520). In this manner, the memory allocator 306 can deallocated any unused memory blocks. The example process of FIG. 5 then ends. However, if the example sparse vector converter 304 determine(s) that there is at least one additional non-zero data element to store (block 514: YES), the example SE organizer(s) 310 determines if the requested memory block is full (block 516).

If the example SE organizer(s) 310 determine(s) that the memory block is not full (block 516: NO), control returns to block 508 to generate and store an additional sparse object in the memory block. If the example SE organizer(s) 310 determines that the memory block is full (block 516: YES), the example SE organizer(s) 310 requests an additional memory block location from the example memory block buffer 308 (FIG. 3) (block 518), and control returns to block 508 to generate and store an additional sparse object in the additional memory block. The example process of FIG. 5 then ends.

Figure 6:
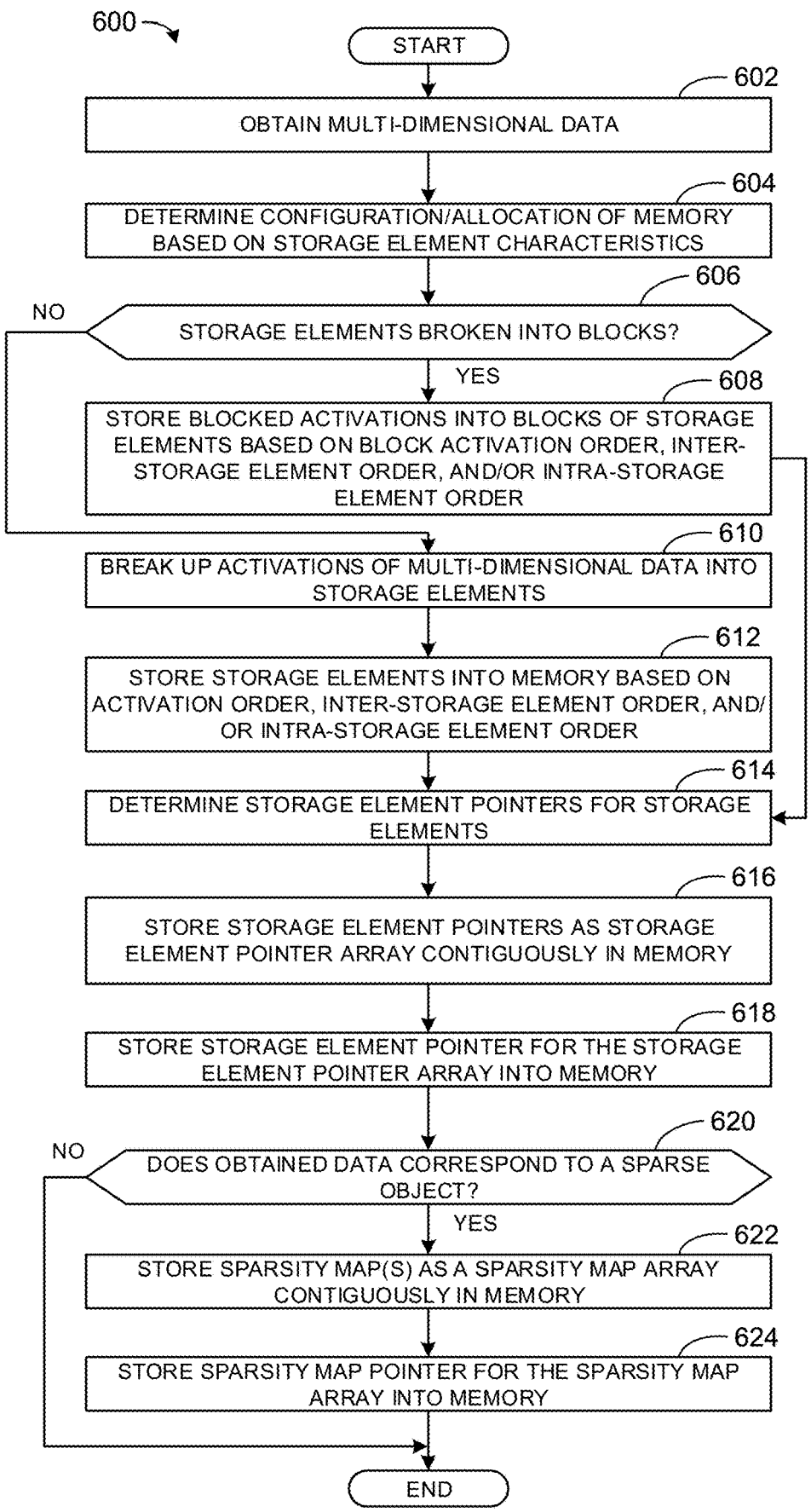
FIG. 6 is a flowchart representative of example machine readable instructions which may be executed to implement the example data storage manager of FIGS. 1 and/or 2 store multi-dimensional data as storage elements in the example memory of FIG. 2.

FIG. 6 is an example flowchart 600 representative of example machine readable instructions that may be executed by the processor 200 (FIG. 2) to implement the example implementation of the data storage manager 202 of FIG. 3 to store multi-dimensional data as SEs in the example memory 204. Although the flowchart 600 of FIG. 6 is described in conjunction with the example data storage manager 202 of FIG. 3, other type(s) of data storage manager(s) and/or other type(s) of processor(s) may be utilized instead. Additionally, although the flowchart 600 is described in conjunction with multi-dimensional data (e.g., tensors), the flowchart 600 may be described in conjunction with other types of data (e.g., weights for weight storage)

At block 602, the example SE organizer(s) 310 (FIG. 3) obtain(s) multi-dimensional data via the example component interface 300 (FIG. 3). At block 604, the example SE organizer(s) 310 determine(s) the configuration and/or allocation of the example memory 204 based on the SE characteristics. For example, if the SE corresponds to a particular dimension, the SE organizer(s) 310 determine(s) the starting location (e.g., a starting memory address) of each chunk of the memory 204 where the SEs will be stored so that the data activations within a SE is stored contiguously. However, as described above, although the data elements within a SE are contiguous, the SEs themselves may or may not be stored contiguously. In some examples, the SE organizer(s) 310 determine(s) the allocation of the memory 204 based on instructions of FIG. 4. At block 606, the example SE organizer(s) 310 determine(s) if the SEs are broken into blocks (e.g., based on user and/or manufacturer preferences).

If the example SE organizer(s) 310 determines that the SEs are broken into blocks (block 606: YES), the example SE organizer(s) 310 store blocked activations (e.g., activations corresponding to the dimensions of the blocks) into the blocks of the SEs based on a block activation order (e.g., XYZ, ZXY, or YZX of the data activations within the blocks), an inter-SE order (e.g., corresponding to where the SEs are to be located in the memory 204), and/or an intra-SE order (e.g., XYZ, ZXY, or YZX of the blocks within the SE) (block 608). In some examples, SEs and/or blocks may correspond to different SE organizer(s) 310 for the purposes of parallel processing to store the data activations in a faster, more efficient manner.

If the example SE organizer(s) 310 determine(s) that the SEs are not broken into blocks (block 606: NO), the example SE organizer(s) 310 break(s) up (e.g., separate(s) or partition(s)) the activations of the multi-dimensional data into the SEs (block 610). For example, if the SEs are sized to fit ten activations (e.g., based on user and/or manufacturer preferences), the example SE organizer(s) 310 break(s) the multi-dimensional data into SEs (e.g., groups) of ten activations. At block 612, the example SE organizer(s) 310 store(s) the storage activations into the memory 204 based on the activation order (e.g., the order of the obtained multi-dimensional data), an inter-SE order (e.g., corresponding to where the SEs are to be located in the memory 204), and/or an intra-SE order (e.g., XYZ, ZXY, or YZX of the activations within the SE). In some examples, SEs may correspond to different SE organizers 310 for the purposes of parallel processing to store the data activations in a faster, more efficient manner.

At block 614, the example SE organizer(s) 310 determines the SE pointers for the SEs based on the starting memory address location in the memory 204 of each SE (e.g., the first location of the first SE corresponds to address X, the first location of the second SE corresponds to address Y, etc.). At block 616, the example SE organizer(s) 310 stores the SE pointers as a SE pointer array contiguously in the memory 204 using the example memory interface 302. At block 618, the example SE organizer(s) 310 store(s) a storage element pointer for the SE pointer array into the memory 204 using the example memory interface 302. The SE pointer tracks the SEs within the SE pointer array. As described above in conjunction with FIG. 3, the SE pointers facilitate selectable execution by the example memory processor unit(s) 312, thereby enabling parallel access of data elements. For example, the memory processor unit(s) 312 can utilize the pointers corresponding to a SE of data element of interests and the memory processor unit(s) 312 can obtain different data elements of interest from different SEs in parallel based on the pointers.

At block 620, the example SE organizer(s) 310 determine(s) if the obtained data corresponds to a sparse object. In some examples, the multi-dimensional data obtained by the example component interface 300 includes instructions to convert the multi-dimensional data into a sparse object and/or already corresponds to a sparse object and sparsity map. In such examples, the sparse vector converter 304 (FIG. 3) may convert the multi-dimensional data into a sparse object and a sparsity map. Responsive to the sparse vector converter 304 generating the sparse object and sparsity map and/or in response to the component interface 300 receiving a sparse object and sparsity map, the SE organizer(s) 310 determine(s) that the obtained object corresponds to a sparse object.

If the example SE organizer(s) 310 determine(s) that the obtained data does not correspond to a sparse object (block 620: NO), example process of FIG. 6 ends. If the example SE organizer(s) 310 determine(s) that the obtained data corresponds to a sparse object (block 620: YES), the example SE organizer(s) 310 stores the sparsity map(s) as a sparsity map array contiguously in the example memory 204 (block 622) using the example memory interface 302. At block 624, the example SE organizer(s) 310 store a sparsity map pointer (e.g., tracking the sparsity map(s)) for the sparsity map array into the example memory 204 using the example memory interface 302. In some examples, the SE organizer(s) 310 may edge pad (e.g., zero-pad by adding zeros) the sparsity map prior to storing in the example memory 204. Zero-padding the sparsity map, as opposed to the data itself, allows the example convolution determiner 316 to be able to filter and/or process the multi-dimensional data based on the padded sparsity map. Thus, no unnecessary calculations are performed (e.g., dot product with a zero data element requires less calculations than with a non-zero data element).

Figure 7:
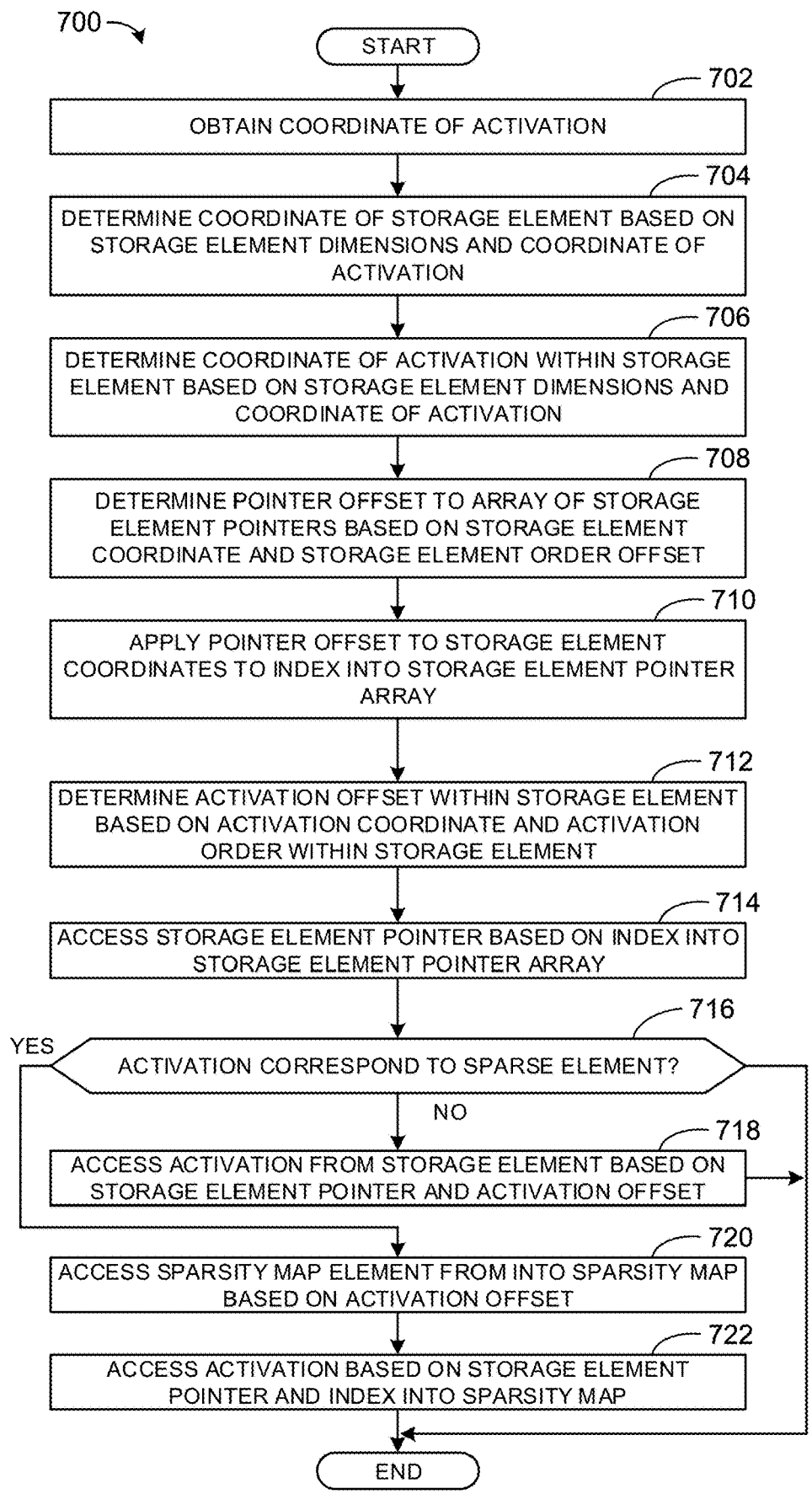
FIG. 7 is a flowchart representative of example machine readable instructions which may be executed to implement the example data storage manager of FIGS. 1 and/or 2 to access multi-dimensional data stored as storage elements in the example memory of FIG. 2.

FIG. 7 is an example flowchart 700 representative of example machine readable instructions that may be executed by the processor 200 (FIG. 2 to implement the example the data storage manager 202 of FIG. 3 to access multi-dimensional data stored as SEs in the example memory 204. The example flowchart 700 of FIG. 7 is described in conjunction with the example tables 1000, 1002 of FIGS. 10A-10B. The first example table 2000 corresponds to offset variables based on a SE order within a tensor (e.g., the order in which the SEs are formed by the multi-dimensional data) and the second example table 2002 corresponds to offset variables based on activation order within the SEs. Although the flowchart 700 of FIG. 7 is described in conjunction with the example data storage manager 202 of FIG. 3, other type(s) of data storage manager(s) and/or other type(s) of processor(s) may be utilized instead. Additionally, although the flowchart 700 is described in conjunction with multi-dimensional data (e.g., tensors), the flowchart 700 may be described in conjunction with other types of data (e.g., weight storage).

At block 702, the example memory processor unit(s) 312 (FIG. 3) obtain(s) a coordinate of activation via the example component interface 300 (FIG. 3). If the example memory processor unit(s) 312 obtain(s) multiple coordinates for multiple activations, the example memory processor unit(s) 312 may process the multiple units in parallel (e.g., based on the SE(s) corresponding to the coordinate of the activations). At block 704, the example memory processor unit(s) 312 determine(s) a coordinate of a SE based on the SE dimensions and the coordinate of the activation (e.g., based on a division operation). For example, when the coordinate of the activation is (za, ya, xa) (e.g., corresponding to activation order ZYX), the example memory processor unit(s) 312 determine(s) the coordinate of the corresponding SE (e.g., the SE that stores the data corresponding to the activation coordinate) based on the below Equation 1.

$$(za \text{ and/or } SE_D, ya \text{ and/or } SE_H, xa \text{ and/or } SE_W) \quad \text{(Equation 1)}$$

In Equation 1, ' and/or' is a division operation without a remainder, $SE_D$ is the depth of the SE, $SE_H$ is the height of the SE, and $SE_W$ is the width of the SE.

At block 706, the example memory processor unit(s) 312 determine(s) the coordinate of the activation within the SE based on the SE dimensions and the coordinate of the activation (e.g., based on a modulo operation). For example, when the coordinate of the activation is (za, ya, xa), the example memory processor unit(s) 312 determine(s) the coordinate of the corresponding SE (e.g., the SE that stores the data corresponding to the activation coordinate) based on the below Equation 2.

$$(za\% \ SE_D, ya\% \ SE_H, xa\% \ SE_W) \quad \text{(Equation 2)}$$

In Equation 2, '%' is a modulo operation.

At block 708, the example memory processor unit(s) 312 determine(s) a pointer offset to the array of SE pointers based on the SE coordinate and a SE order offset (e.g., the order of the activations within the SE). For example, the memory processor unit(s) 312 determine(s) a pointer offset based on the below equation 3.

$$P_{off} = ((za \text{ and/or } SE_D)*Z_{TSOFF}) + ((ya \text{ and/or } SE_H) \\ *Y_{TSOFF}) + ((xa \text{ and/or } SE_W)*X_{TSOFF}) \quad \text{(Equation 3)}$$

In Equation 3, $P_{off}$ is the pointer offset, is a multiplication operation, and $Z_{TSOFF}$, $Y_{TSOFF}$, and $X_{TSOFF}$ are offsets that are based on the SE ordering within the tensor (e.g., the order of XYZ, XZY, YZX, YXZ, etc. of how the SEs are stored). The $Z_{TSOFF}$, $Y_{TSOFF}$, and $X_{TSOFF}$ can be determined based on the first example table 1000 of FIG. 10A.

At block 710, the example memory processor unit(s) 312 apply(ies) the pointer offset to the SE coordinates to index into the SE pointer array. For example, if the offset is four, the example memory processor unit(s) 312 move(s) the SE pointer of the SE pointer array based on the offset value of four. At block 712, the example memory processor unit(s) 312 determine(s) the activation offset within the SE based on the activation coordinate and an activation order within the SE (e.g., the order in which the activations were stored within the SEs). For example, the memory processor unit(s) 312 determine(s) a activation offset based on the below Equation 4.

$$A_{SOFF} = ((za\% \ SE_D)*Z_{SAOFF}) + ((ya\% \ SE_H)*Y_{SAOFF}) + \\ ((xa\% \ SE_W)*X_{SAOFF}) \quad \text{(Equation 4)}$$

In Equation 4, $A_{SOFF}$ is the activation offset, and $Z_{SAOFF}$, $Y_{SAOFF}$, and $X_{ASOFF}$ are offsets that are based on the activation order within the SE (e.g., the order of XYZ, XZY, YZX, YXZ, etc. of how the activations are stored in the SEs). The $Z_{SAOFF}$, $Y_{SAOFF}$, and $X_{SAOFF}$ can be determined based on the first example table 1002 of FIG. 10B.

At block 714, the example memory processor unit(s) 312 access(es) the SE pointer based on the index into the SE pointer array using the example memory interface 302 (FIG. 3). The accessed pointer corresponds to the first location of the SE that includes the activation corresponding to the obtained activation coordinate. At block 716, the example memory processor unit(s) 312 determine(s) if the activation corresponds to a sparse object. For example, the data stored as SEs in the example memory 204 may be dense data or a sparse object and corresponding sparsity map corresponding to the dense data. If the example memory processor unit(s) 312 determines that the activation does not correspond to a sparse object (block 716: NO), the example memory processor unit(s) 312 access the activation by accessing the data stored in a location corresponding to the SE pointer and the activation offset coordinates within the SE in the memory 204 using the example memory interface 302 (block 718). For example, the memory processor unit(s) 312 traverse the memory 204 to the location identified in the SE pointer (e.g., the start of the SE) and moves to the location corresponding to the index into the sparsity map to obtain the activation.

If the example memory processor unit(s) 312 determine(s) that the activation corresponds to a sparse object (block 716: YES), the example memory processor unit(s) 312 apply(ies) the activation offset to index into the sparsity map (block 720). For example, the memory processor unit(s) 312 access a location corresponding to the sparsity map based on the sparsity map pointer plus the activation offset to access a sparsity map element (e.g., a '0' or a '1') using the example memory interface 302. In this manner, if the sparsity map element is a '0,' the memory processor unit(s) 312 determine that the activation is a zero. If the sparsity map element is a '1,' the memory processor unit(s) 312 determine that the activation is a non-zero value and determines the non-zero value by accessing the location corresponding to the activation in the memory 204. For example, the memory processor unit(s) 312 may determine the ones count on sparsity map to get an offset to access the activation. At block 722, the example memory processor unit(s) 312 access(es) the activation based on the SE pointer and the activation offset using the example memory interface 302. The example process of FIG. 7 ends.

Figure 8:
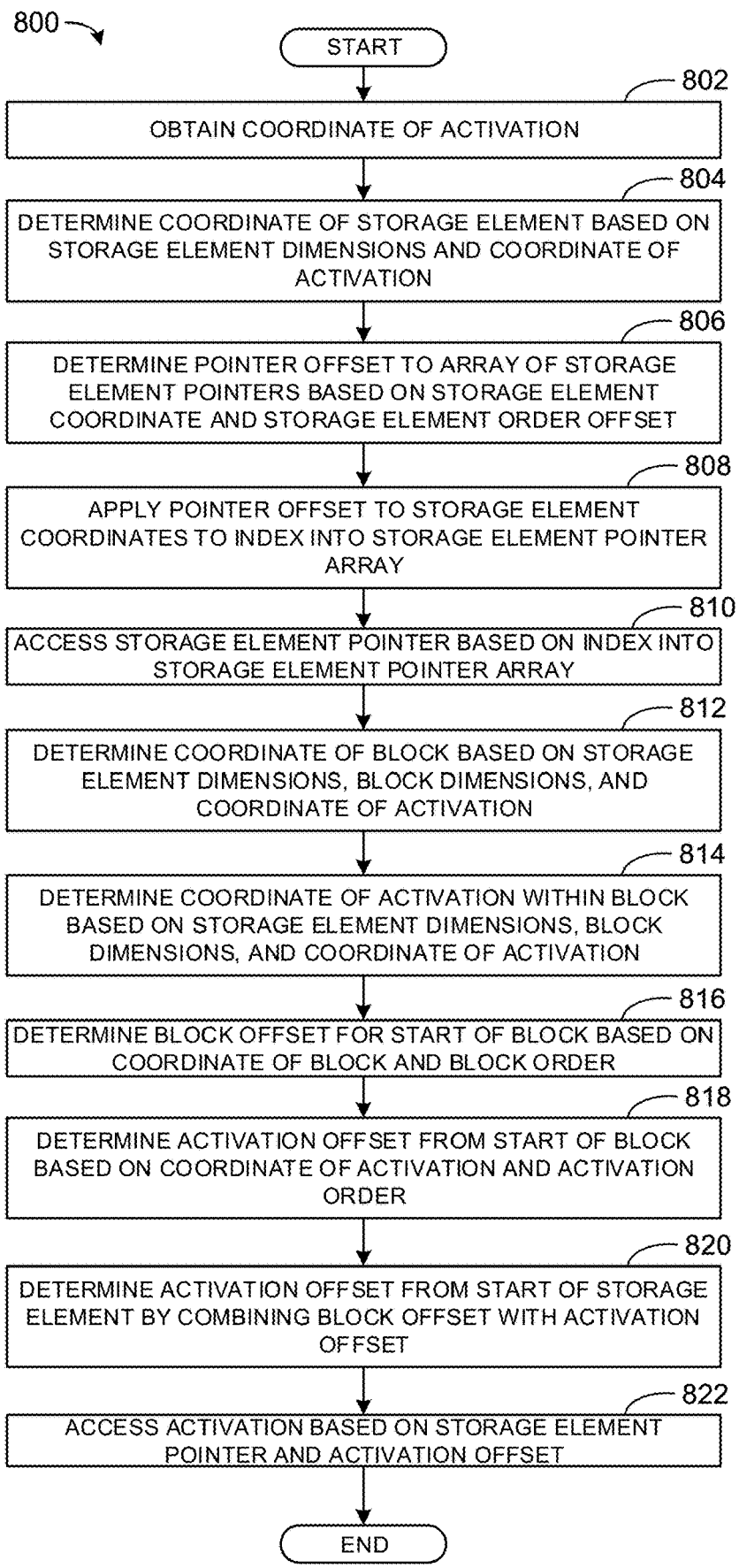
FIG. 8 is a flowchart representative of example machine readable instructions which may be executed to implement the example data storage manager of FIGS. 1 and/or 2 to access multi-dimensional data stored as storage elements in blocks in the example memory of FIG. 2.

FIG. 8 is an example flowchart 800 representative of example machine readable instructions that may be executed by the processor 200 of FIG. 2 to implement the example the data storage manager 202 of FIG. 3 to access multi-dimensional data stored as SEs in blocks in the example memory 204. The example flowchart 800 of FIG. 8 is described in conjunction with the example tables 1000, 1002, 1004, 1006 of FIGS. 10A-10D. The first example table 1000 corresponds to offset variables based on a SE order within a tensor (e.g., the order in which the SEs are formed by the multi-dimensional data), the second example table 1002 corresponds to offset variables based on activation order within the SEs, the third example table 1004 corresponds to offset variables based on block order within a SE and the fourth example table corresponds to offset variables based on activation order within the blocks. Although the flowchart 800 of FIG. 8 is described in conjunction with the example data storage manager 202 of FIG. 3, other type(s) of data storage manager(s) and/or other type(s) of processor(s) may be utilized instead. Additionally, although the flowchart 800 is described in conjunction with multi-dimensional data (e.g., tensors), the flowchart 800 may be described in conjunction with other types of data (e.g., weight storage).

At block 802, the example memory processor unit(s) 312 (FIG. 3) obtain(s) one or more coordinates of activations. If there are more than one coordinate for different activations, the memory processor unit(s) 312 may divide the access of the different coordinates between different memory processor units 312 to facilitate parallel processing. At block 804, the example memory processor unit(s) 312 determine(s) a coordinate of a SE based on the SE dimensions and the coordinate of the activation (e.g., based on a division operation). For example, the example memory processor unit(s) 312 determine(s) the coordinate of the corresponding SE (e.g., the SE that stores the data corresponding to the activation coordinate) based on the above Equation 1.

At block 806, the example memory processor unit(s) 312 determine(s) a pointer offset to the array of SE pointers based on the SE coordinate and a SE order offset (e.g., the order of SE within the tensor). For example, the memory processor unit(s) determine(s) a pointer offset based on the above Equation 3. At block 808, the example memory processor unit(s) 312 apply(ies) the pointer offset to the SE coordinates to index into the SE pointer array. For example, if the offset is four, the example memory processor unit(s) 312 move(s) the SE pointer of the SE pointer array based on the offset value of four. At block 810, the example memory processor unit(s) 312 access(es) the SE pointer based on the index into the SE pointer array using the example memory interface 302 (FIG. 3). The accessed pointer corresponds to the first location of the SE that includes the activation corresponding to the obtained activation coordinate.

At block 812, the example memory processor unit(s) 312 determine(s) a coordinate of a storage block (SB) corresponding to the activation based on the SE dimensions, the block dimensions, and the coordinate of the activation. For example, the memory processor unit(s) 312 may determine the coordinate of the block based on the below Equation 5.

$$((za\% \ SE_D) \ and/or \ SB_D, (ya\% \ SE_H) \ and/or \ SB_H, (xa\% \ SE_W) \ and/or \ SB_W) \quad \text{(Equation 5)}$$

In Equation 5, $SB_D$ is the depth of the block, $SB_H$ is the height of the block, and $SB_W$ is the width of the block.

At block 814, the example memory processor unit(s) 312 determine(s) the coordinate of the activation within the block based on the SE dimensions, the block dimensions, and the coordinate of activation. For example, the memory processor unit(s) 312 may determine the coordinate of the activation within the block based on the below Equation 6.

$$((za\% \ SE_D)\% \ SB_D, (ya\% \ SE_H)\% \ SB_H, (xa\% \ SE_W)\% \ SB_W) \quad \text{(Equation 6)}$$

At block 816, the example memory processor unit(s) 312 determine(s) a block offset for the start of the block based on the coordinate of the block and the block order within the SE. For example, the memory processor unit(s) 312 may determine the block offset based on the below Equation 7.

$$B_{SOFF} = SB_S *((((za\% \ SE_D) \ and/or \ SB_D)*Z_{SBOFF}) + (((ya\% \ SE_H) \ and/or \ SB_D)*Y_{SBOFF}) + (((xa\% \ SE_W) \ and/or \ SB_W)*X_{SBOFF})) \quad \text{(Equation 7)}$$

Where $B_{SOFF}$ is the starting location of the block within which the activation lies within a SE, and $Z_{SBOFF}$, $Y_{SBOFF}$, and $X_{SBOFF}$ are block offsets corresponding to the order of the blocks within the SE. The $Z_{SBOFF}$, $Y_{SBOFF}$, and $X_{SBOFF}$ offsets can be determined based on the first example table 1004 of FIG. 10C.

At block 818, the example memory processor unit(s) 312 determine(s) the activation offset from the start of the block based on the coordinate of the activation and the activation order within the block. For example, the memory processor unit(s) 312 may determine the activation offset based on the below Equation 8.

$$A_{BOFF} = (((za\% \ SE_D)\% \ SB_D)*Z_{BAOFF}) + (((ya\% \ SE_H)\% \ SB_H)*Y_{BAOFF}) + (((xa\% \ SE_W)\% \ SB_W)*X_{BAOFF}) \quad \text{(Equation 8)}$$

In Equation 8, $A_{BOFF}$ is the offset to the activation from the start of the block, and $Z_{BAOFF}$, $Y_{BAOFF}$, and $X_{BAOFF}$ are activation offsets corresponding to the order of the activations are stored within the block. The $Z_{BAOFF}$, $Y_{BAOFF}$, and $X_{BAOFF}$ offsets can be determined based on the first example table 1006 of FIG. 10D.

At block 820, the example memory processor unit(s) 312 determine(s) the activation offset from the start of the SE by combining (e.g., adding) the block offset with the activation offset. For example, the memory processor unit(s) 312 determine(s) the activation offset from the start of the SE based on the below Equation 9.

$$A_{SOFF} = B_{SOFF} + A_{BOFF} \quad \text{(Equation 9)}$$

At block 822, the example memory processor unit(s) 312 access(es) the activation based on the SE pointer and the activation offset using the example memory interface 302. For example, the memory processor unit(s) 312 traverse(s) the memory 204 to the location identified in the SE pointer (e.g., the start of the SE) and move(s) to the location corresponding to the index into the sparsity map to obtain the activation. The example process of FIG. 8 ends.

Figure 9:
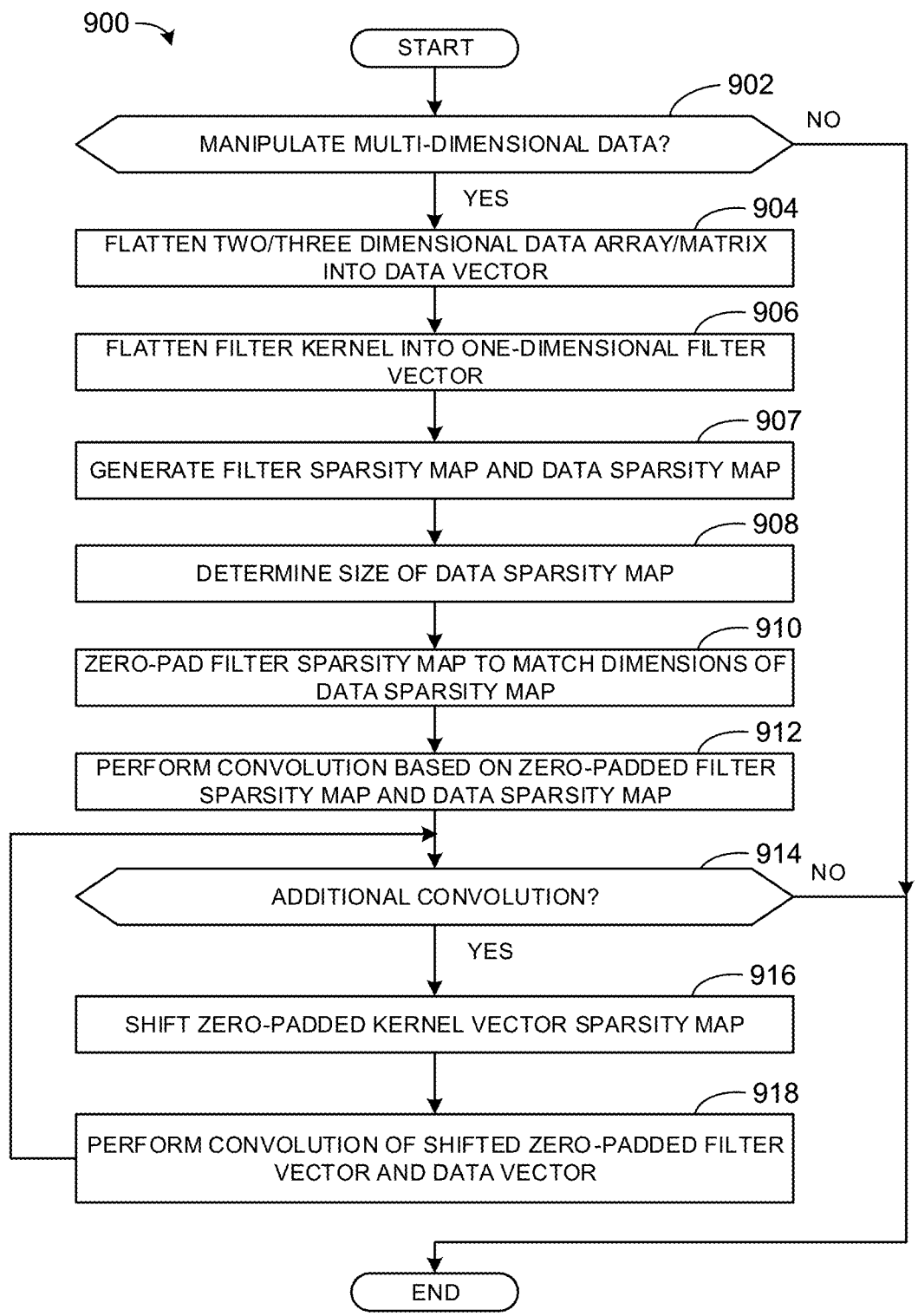
FIG. 9 is a flowchart representative of example machine readable instructions which may be executed to implement the example data storage manager of FIGS. 1 and/or 2 to manipulate an accessed tensor to facilitate a more efficient processing of the accessed tensor for a tile-based pattern protocol.

FIG. 9 is an example flowchart 900 representative of example machine readable instructions that may be executed by the processor 200 (FIG. 2) to implement the example data storage manager 202 of FIG. 3 to manipulate an accessed tensor to facilitate a more efficient processing of the accessed tensor for a tile-based pattern protocol. The example flowchart 900 of FIG. 9 is described in conjunction with the example of FIGS. 11A-B. Although the flowchart 900 of FIG. 9 is described in conjunction with the example data storage manager 112 of FIG. 3, other type(s) of data storage manager(s) and/or other type(s) of processor(s) may be utilized instead. As described above, some techniques for processing tensors include preforming X number of convolutions (e.g., where X is equal to the number of data elements being filtered) with the Y number of weights. However, other techniques for processing tensors may utilize convolution techniques that may involve manipulating bitmaps to reduce the amount of resources required to perform convolution. Accordingly, the flowchart 900 of FIG. 9 correspond to techniques where bitmaps are used to perform convolutions to save processor resources.

At block 902, the example vector manipulator 314 (FIG. 3) determines if manipulation of multi-dimensional data is desired. For example, the vector manipulator 314 may receive instructions to manipulate multi-dimensional data from the example tile-based convolution determiner 316 (FIG. 3) to manipulate the accessed multi-dimensional data to be able to fit with a tile-based pattern of a particular size. If the example vector manipulator 314 determines that the manipulation of the multi-dimensional data is not desired (block 902: NO), control ends. If the example vector manipulator 314 determines that the manipulation of the multi-dimensional data is desired (block 902: YES), the example vector manipulator 314 flattens the two-three dimensional data array and/or matrix into a one-dimensional data vector (block 904). For example, the example two dimensional data 1100 (e.g., a data kernel) of FIG. 11 corresponds to a four-by-four matrix of data corresponding to a four-by-four image that has been zero-padded to include zeros padding the image, thereby corresponding to a six-by-six kernel. The example vector manipulator 314 flattens the example two dimensional data 1100 into the example one-dimensional data vector 1102. In the example one-dimensional data vector 1102, example data elements 1104 correspond to example data element locations 1106. By flattening the dimensional data into a smaller dimension, a convolution engine can process regardless of the original dimensions of the data by forcing the bitmap to exhibit the same behavior without looping protocols, thereby removing control logic in a processing engine.

At block 906, the example vector manipulator 314 flattens the filter kernel (e.g., the tile-based pattern) into a one-dimensional filter vector. For example, the example filter kernel 1108 of FIG. 11 corresponds to a three-by-three matrix of weights corresponding to a filter kernel. The example vector manipulator 314 flattens the example filter kernel 1108 into the example one-dimensional filter vector 1110. In the example one-dimensional filter vector 1110, example data elements 1112 correspond to the example data element locations 1114. At block 907, the example sparse vector converter 304 generates a filter sparsity map based on the filter vector and a data sparsity map based on the data vector.

At block 908, the example vector manipulator 314 determines the size of the data sparsity map. For example, because the size of the sparsity map of the data vector 1102 is the same as the size of the data vector 1102, the vector manipulator 314 determines the size of the data vector 1102 to be 36 data elements. At block 910, the example vector manipulator 314 zero-pads the filter sparsity map to match the size of the data sparsity map, corresponding to an artificial kernel sparsity map. For example, the vector manipulator 314 may zero-pad the filter sparsity map by generating the artificial kernel sparsity map with a group of $F_w$ ones followed by $I_w-F_w$, zeros repeated $F_h$ times, followed by zeros for any remaining bits, where $F_w$ is the width of the filter kernel 1108, $I_w$ is the width of the data kernel 1100, and $F_h$ is the height of the filter kernel 1108. The example artificial sparsity map 1118 corresponds to a zero-padding of a filter sparsity map corresponding to the example filter kernel 1108 using the above-referenced technique.

At block 912, the example tile-based convolution determiner 316 preforms a convolution (e.g., the initial convolution 1116) based on the zero-padded filter sparsity map (e.g., the example zero-padded filter sparsity map 1118) and the data sparsity map (e.g., the example data sparsity map 1120). At block 914, the example tile-based convolution determiner 316 determines if an additional convolution is needed. For example, as described above the number of convolutions needed correspond to the number of data elements that are to be filtered. If the example tile-based convolution determiner 316 determines that an additional convolution is not needed (block 914: NO), control ends. If the example tile-based convolution determiner 316 determines that an additional convolution is needed (block 914: YES), the example vector manipulator 314 shifts the zero-padded kernel vector sparsity map (block 916). The amount of bits that the kernel vector sparsity map is shifted depends on the dimensions of the current count of convolutions, the dimensions of the data kernel 1100 and the dimensions of the filter kernel 1108. For example, for the second convolution (e.g., the example convolution 1122 of FIG. 11B), the zero-padded filter sparsity map 1118 is shifted left by one bit (e.g., corresponding to the example shifted zero padded filter sparsity map 1124), corresponding to the required sequence of addresses for the filtering process. However, a different shift is required after a number of convolutions equal to the width of the data kernel, the different shift being equal to the width of the filter kernel 1108. For example, after four convolutions (e.g., the width of the data kernel 1100), and each subsequent four convolutions, the vector manipulator 314 shifts the zero-padded filter sparsity map by three (e.g., the width of the filter kernel 1108).

At block 918, the example tile-based convolution determiner 316 preforms a convolution (e.g., the second convolution 1122) based on the shifted zero-padded filter sparsity map (e.g., the example shifted zero-padded filter sparsity map 1124) and the data sparsity map (e.g., the example data sparsity map 1120). In some examples, the vector manipulator 314 sets up all the necessary convolutions by generating all the necessary shifts of the filter zero-padded sparsity map for the convolutions, so that the tile-based convolution determiner 316 can perform the necessary convolutions in parallel. The example process of FIG. 9 ends.

Figure 12:
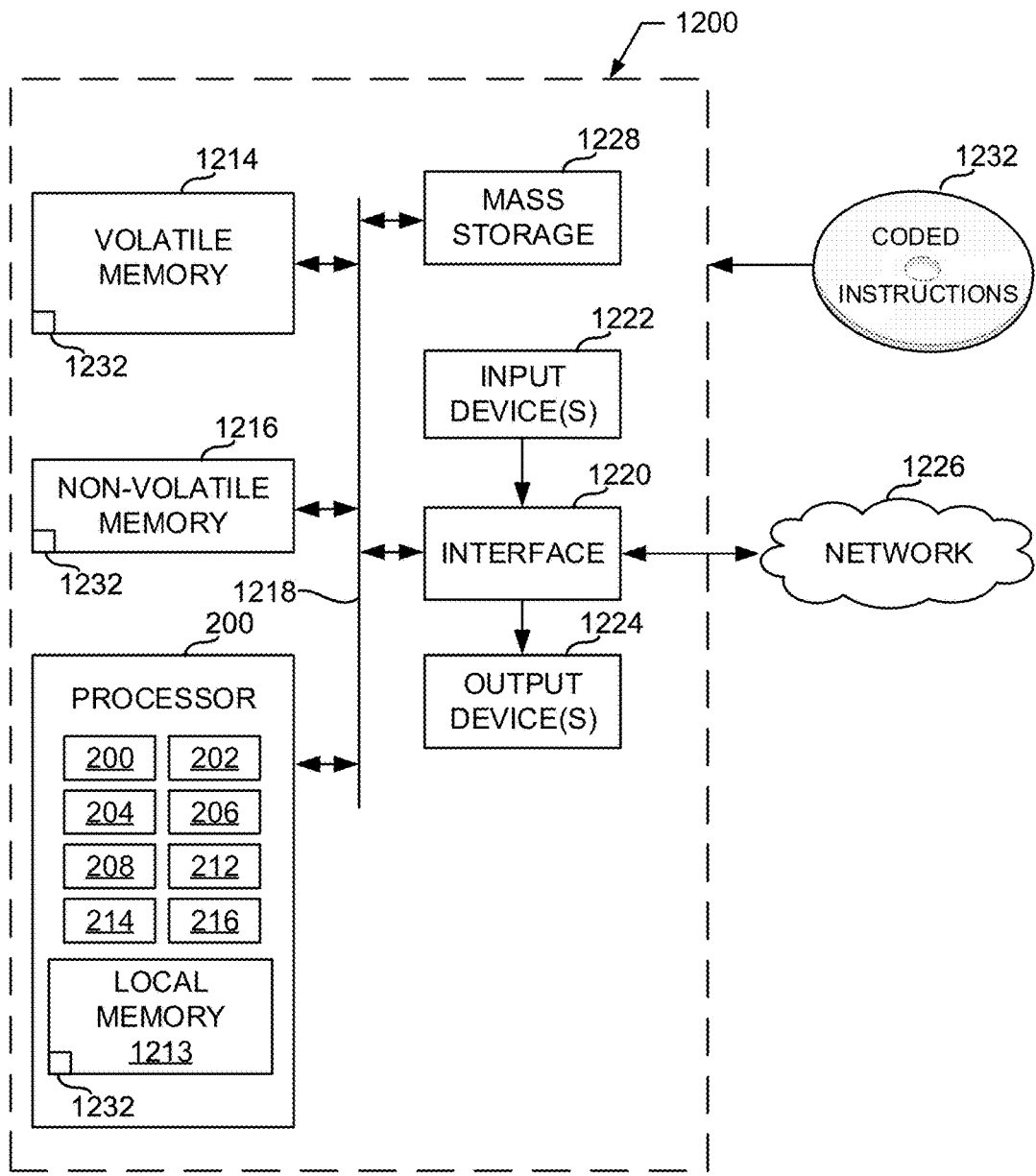
FIG. 12 is a block diagram of an example processor platform structured to execute the instructions of FIGS. 4, 5, 6, 7, 8, and/or 9 to implement the example data storage manager of FIGS. 2 and/or 3.

FIG. 12 is a block diagram of an example processor platform 1200 structured to execute the instructions of FIG. 3 to implement the example data storage manager 202 of FIG. 3. The processor platform 1200 can be, for example, a server, a personal computer, a workstation, a self-learning machine (e.g., a neural network), a mobile device (e.g., a cell phone, a smart phone, a tablet such as an iPad™), or any other type of computing device.

The processor platform 1200 of the illustrated example includes a processor 200. The processor 200 of the illustrated example is hardware. For example, the processor 200 can be implemented by one or more integrated circuits, logic circuits, microprocessors, GPUs, DSPs, or controllers from any desired family or manufacturer. The hardware processor 200 may be a semiconductor based (e.g., silicon based) device. In this example, the processor implements the example component interface 300, the example memory interface 302, the example sparse vector converter 304, the example memory allocator 306, the example storage organizer(s) 310, the example memory processing unit(s) 312, the example vector manipulator 314, the example tile-based convolution determiner 316.

The processor 200 of the illustrated example includes a local memory 1213 (e.g., a cache). In some examples, the local memory 1213 implements the example memory block buffer 308. The processor 200 of the illustrated example is in communication with a main memory including a volatile memory 1214 and a non-volatile memory 1216 via a bus 1218. In some examples, the main memory implements the example memory 204. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 200. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

Machine executable instructions 1232 represented in FIGS. 4-9 may be stored in the mass storage device 1228, in the volatile memory 1214, in the non-volatile memory 1216, and/or on a removable non-transitory computer readable storage medium such as a CD or DVD.

Example 1 includes an apparatus to store multi-dimensional data, the apparatus comprising a memory, a memory allocator to allocate part of the memory for storage of a multi-dimensional data object, and a storage element organizer to separate the multi-dimensional data into storage elements, store the storage elements in the memory, ones of the storage elements being selectively executable independent from others of the storage elements, store starting memory address locations for the storage elements in an array in the memory, the array to facilitate selectively accessing the storage elements in the memory, store a pointer for the array into the memory.

Example 2 includes the apparatus of example 1, wherein the storage element organizer is to, when the multi-dimensional data is a sparse object store a sparsity map corresponding to the sparse object in the memory, and store a sparsity map pointer for the sparsity map.

Example 3 includes the apparatus of example 1, wherein the memory allocator is to allocate part of the memory for storage of the multi-dimensional data object by allocating a number of memory blocks in the memory, and storing allocated memory address locations of the memory blocks in a buffer.

Example 4 includes the apparatus of example 3, wherein the storage element organizer is to store the storage elements by pulling one of the allocated memory address locations of one of the memory blocks from the buffer and storing a corresponding one of the storage elements starting at the one of the allocated memory address locations.

Example 5 includes the apparatus of example 3, wherein the memory allocator is to monitor the buffer, and when a number of the allocated memory address locations stored in the buffer is below a first threshold allocate additional memory blocks in the memory, and store additional allocated memory addresses of the additional memory blocks in the buffer.

Example 6 includes the apparatus of example 5, wherein the memory is a first memory, and the memory allocator is to, when a number of available memory blocks is below a second threshold, move data stored in an already populated memory block into a second memory.

Example 7 includes the apparatus of example 1, wherein the storage element organizer is to store the storage elements non-contiguously in the memory.

Example 8 includes the apparatus of example 1, wherein the storage element organizer is a first storage element organizer, the storage elements are first storage elements, and the starting memory address locations are first starting memory address locations, further including a second storage element organizer to store second storage elements in the memory, and store second starting memory addresses for the second storage elements in the array in the memory.

Example 9 includes the apparatus of example 8, wherein the second storage element organizer is to store the second storage elements in the memory during a same time duration as the first storage element organizer stores the first storage elements in the memory.

Example 10 includes a non-transitory computer readable storage medium comprising instructions which, when executed, cause one or more processors to at least allocate part of memory for storage of a multi-dimensional data object, and partition the multi-dimensional data into storage elements, store the storage elements in the memory, ones of the storage elements being selectively executable independent from others of the storage elements, store starting memory address locations for the storage elements in an array into the memory, the array to facilitate selectively accessing the storage elements in the memory, and store a pointer for the array into the memory.

Example 11 includes the computer readable storage medium of example 10, wherein the instructions case the one or more processors to, when the multi-dimensional data is a sparse object store a sparsity map corresponding to the sparse object in the memory, store a sparsity map pointer for the sparsity map.

Example 12 includes the computer readable storage medium of example 10, wherein the instructions case the one or more processors to allocate part of the memory for storage of the multi-dimensional data object by allocating a number of memory blocks in the memory, and storing allocated memory address locations of the memory blocks in a buffer.

Example 13 includes the computer readable storage medium of example 12, wherein the instructions case the one or more processors to store the storage elements by pulling one of the allocated memory address locations of one of the memory blocks from the buffer and storing a corresponding one of the storage elements starting at the one of the allocated memory address locations.

Example 14 includes the computer readable storage medium of example 12, wherein the instructions case the one or more processors to monitor the buffer, and when a number of the allocated memory address locations stored in the buffer is below a first threshold allocate additional memory blocks in the memory, and store additional allocated memory address locations of the additional memory blocks in the buffer.

Example 15 includes the computer readable storage medium of example 14, wherein the memory is a first memory, and the instructions case the one or more processors to, when a number of available memory blocks is below a second threshold, move data stored in an already populated memory block into a second memory.

Example 16 includes the computer readable storage medium of example 10, wherein the instructions case the one or more processors to store the storage elements non-contiguously in the memory.

Example 17 includes the computer readable storage medium of example 10, wherein the storage elements are first storage elements, and the starting memory address locations are first starting memory address locations, wherein the instructions case the one or more processors to store second storage elements in the memory, and store second starting memory address locations for the second storage elements in the array in the memory.

Example 18 includes the computer readable storage medium of example 17, wherein the instructions case the one or more processors to store the second storage elements in the memory during a same time duration as the first storage element organizer stores the first storage elements in the memory.

Example 19 includes a method to store multi-dimensional data, the method comprising allocating, by executing an instructions with one or more processors, part of memory for storage of a multi-dimensional data object, and partitioning, by executing an instructions with the one or more processors, the multi-dimensional data into storage elements, storing the storage elements in the memory, ones of the storage elements being selectively executable independent from others of the storage elements, storing starting memory address locations for the storage elements in an array into the memory, the array to facilitate selectively accessing the storage elements in the memory, and storing a pointer for the array into the memory.

Example 20 includes the method of example 19, further including, when the multi-dimensional data is a sparse object storing a sparsity map corresponding to the sparse object in the memory, and storing a sparsity map pointer for the sparsity map.

Example 21 is an example computer readable medium comprises first instructions that when executed cause a machine to at least one of distribute, configure, assemble, install, instantiate, retrieve, decompress, and decrypt second instructions for execution, the second instructions to, when executed, cause a machine to at least allocate part of memory for storage of a multi-dimensional data object, and partition the multi-dimensional data into storage elements, store the storage elements in the memory, ones of the storage elements being selectively executable independent from others of the storage elements, store starting memory address locations for the storage elements in an array into the memory, the array to facilitate selectively accessing the storage elements in the memory, and store a pointer for the array into the memory.

Example 22 includes the computer readable storage medium of example 21, wherein the instructions case the one or more processors to, when the multi-dimensional data is a sparse object store a sparsity map corresponding to the sparse object in the memory, store a sparsity map pointer for the sparsity map.

Example 23 includes the computer readable storage medium of example 21, wherein the instructions case the one or more processors to allocate part of the memory for storage of the multi-dimensional data object by allocating a number of memory blocks in the memory, and storing allocated memory address locations of the memory blocks in a buffer.

Example 24 includes the computer readable storage medium of example 23, wherein the instructions case the one or more processors to store the storage elements by pulling one of the allocated memory address locations of one of the memory blocks from the buffer and storing a corresponding one of the storage elements starting at the one of the allocated memory address locations.

Example 25 includes the computer readable storage medium of example 23, wherein the instructions case the one or more processors to monitor the buffer, and when a number of the allocated memory address locations stored in the buffer is below a first threshold allocate additional memory blocks in the memory, and store additional allocated memory address locations of the additional memory blocks in the buffer.

Example 26 includes the computer readable storage medium of example 25, wherein the memory is a first memory, and the instructions case the one or more processors to, when a number of available memory blocks is below a second threshold, move data stored in an already populated memory block into a second memory.

Example 27 includes the computer readable storage medium of example 21, wherein the instructions case the one or more processors to store the storage elements non-contiguously in the memory.

Example 28 includes the computer readable storage medium of example 21, wherein the storage elements are first storage elements, and the starting memory address locations are first starting memory address locations, wherein the instructions case the one or more processors to store second storage elements in the memory, and store second starting memory address locations for the second storage elements in the array in the memory.

Example 29 includes the computer readable storage medium of example 28, wherein the instructions case the one or more processors to store the second storage elements in the memory during a same time duration as the first storage element organizer stores the first storage elements in the memory.

From the foregoing, it will be appreciated that example methods, apparatus and articles of manufacture have been disclosed that store and access multi-dimensional data to and/or from memory. The disclosed methods, apparatus and articles of manufacture improve the efficiency and flexibility of a computing device by breaking up multi-dimensional data into storage elements storing the storage elements into the memory, as opposed to storing the entire multi-dimensional data as one unit. Because storage elements may be stored non-contiguously, examples disclosed herein provide a more flexible storage scheme where tensors can be stored in different parts of memory, when the amount of contiguous memory available is insufficient to store an entire tensor. Additionally, because each storage is stored as a separate sub-unit corresponding to a separate pointer, examples disclosed herein facilitate parallel processing to be able to store and/or access activations from multiple different storage elements at the same time, thereby increasing the efficiency of data access. Additionally, because the storage elements may be smaller than the entire tensor (e.g., include less activations stored in less locations in the memory), the amount of time it takes for a processor to traverse through a storage element will be smaller than the amount of time that it takes for the processor to traverse through an entire tensor. Disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to store a sparsity matrix, the apparatus comprising:
   memory;
   a memory allocator to allocate part of the memory to store a sparsity matrix; and
   a storage element organizer to:
      separate the sparsity matrix into a first subsection of the sparsity matrix and a second subsection of the sparsity matrix;
      store the first subsection of the sparsity matrix at a first memory location in the memory and the second subsection of the sparsity matrix in a second memory location in the memory, the first subsection of the sparsity matrix being selectively executable independent from the second subsection of the sparsity matrix;
      store a pointer array including (1) a first pointer to a first starting memory address corresponding to the first memory location of the first subsection of the sparsity matrix in the memory and (2) a second pointer to a second starting memory address corresponding to the second memory location of the second subsection of the sparsity matrix in the memory, the pointer array to facilitate selectively accessing the first subsection of the sparsity matrix and the second subsection of the sparsity matrix in the memory; and
      store a pointer for the pointer array into the memory.

2. The apparatus of claim 1, wherein the storage element organizer is to:
   store a sparsity map corresponding to the sparse matrix in the memory; and
   store a sparsity map pointer for the sparsity map.

3. The apparatus of claim 1, wherein the memory allocator is to allocate part of the memory to store the sparsity matrix by:
   allocating a number of memory blocks in the memory; and
   storing allocated memory addresses of the memory blocks in a buffer.

4. The apparatus of claim 3, wherein the storage element organizer is to store the first subsection of the sparsity matrix by accessing one of the allocated memory addresses of one of the memory blocks from the buffer and storing the first subsection starting at the one of the allocated memory addresses.

5. The apparatus of claim 3, wherein the memory allocator is to:
   monitor the buffer; and
   when a number of the allocated memory addresses stored in the buffer is below a first threshold:
      allocate additional memory blocks in the memory; and
      store additional allocated memory addresses of the additional memory blocks in the buffer.

6. The apparatus of claim 5, wherein the memory is first memory, and the memory allocator is to, when a number of available memory blocks is below a second threshold, move data stored in an already populated memory block into second memory.

7. The apparatus of claim 1, wherein the storage element organizer is to store the first subsection of the sparsity matrix and the second subsection of the sparsity matrix non-contiguously in the memory.

8. The apparatus of claim 1, wherein the storage element organizer is a first storage element organizer, further including a second storage element organizer to:
   store a third subsection of the sparsity matrix and a fourth subsection of the sparsity matrix in the memory; and
   store (a) a third pointer to a third starting memory address corresponding to a third memory location of the third subsection of the sparsity matrix and (b) a fourth pointer to a fourth starting memory address corresponding to a fourth memory location of the fourth subsection of the sparsity matrix in the pointer array in the memory.

9. The apparatus of claim 8, wherein the second storage element organizer is to store the third subsection of the sparsity matrix and the fourth subsection of the sparsity matrix in the memory during a same time duration as the first storage element organizer stores the first subsection of the sparsity matrix and the second subsection of the sparsity matrix in the memory.

10. The apparatus of claim 1, wherein the pointer array facilitates a first processor to process the first subsection of the sparsity matrix from the memory while a second processor processes the second subsection of the sparsity matrix.

11. The apparatus of claim 1, wherein the storage element organizer is to store (a) a first sparsity map corresponding to the first subsection of the sparsity matrix at the first memory location and a second sparsity map corresponding to the second subsection of the sparsity matrix at the second memory location.

12. A non-transitory computer readable storage medium comprising instructions which, when executed, cause one or more processors to at least:
   allocate part of memory to store a sparsity matrix; and
   partition the sparsity matrix into a first subsection of the sparsity matrix and a second subsection of the sparsity matrix;
   store the first subsection of the sparsity matrix at a first memory location in the memory and the second subsection of the sparsity matrix in a second memory location in the memory, the first subsection of the sparsity matrix being selectively executable independent from the second subsection of the sparsity matrix;
   store a pointer array including (1) a first pointer to a first starting memory address corresponding to the first memory location of the first subsection of the sparsity matrix in the memory and (2) a second pointer to a second starting memory address corresponding to the second memory location of the second subsection of the sparsity matrix in the memory, the pointer array to facilitate selectively accessing the first subsection of the sparsity matrix and the second subsection of the sparsity matrix in the memory; and
   store a pointer for the pointer array into the memory.

13. The computer readable storage medium of claim 12, wherein the instructions cause the one or more processors to;
   store a sparsity map corresponding to the sparse matrix in the memory; and
   store a sparsity map pointer for the sparsity map.

14. The computer readable storage medium of claim 12, wherein the instructions cause the one or more processors to allocate part of the memory to store the sparsity matrix by:
   allocating a number of memory blocks in the memory; and
   storing allocated memory addresses of the memory blocks in a buffer.

15. The computer readable storage medium of claim 14, wherein the instructions cause the one or more processors to store the first subsection of the sparsity matrix by accessing one of the allocated memory addresses of one of the memory blocks from the buffer and storing the first subsection of the sparsity matrix starting at the one of the allocated memory addresses.

16. The computer readable storage medium of claim 14, wherein the instructions cause the one or more processors to:
monitor the buffer; and
when a number of the allocated memory addresses stored in the buffer is below a first threshold:
allocate additional memory blocks in the memory; and
store additional allocated memory addresses of the additional memory blocks in the buffer.

17. The computer readable storage medium of claim 16, wherein the memory is first memory, and the instructions cause the one or more processors to, when a number of available memory blocks is below a second threshold, move data stored in an already populated memory block into second memory.

18. The computer readable storage medium of claim 12, wherein the instructions cause the one or more processors to store the first subsection of the sparsity matrix and the second subsection of the sparsity matrix non-contiguously in the memory.

19. The computer readable storage medium of claim 12, wherein the instructions cause the one or more processors to:
store a third subsection of the sparsity matrix and a fourth subsection of the sparsity matrix in the memory during a same time duration as the storing of the first subsection of the sparsity matrix and the second subsection of the sparsity matrix in the memory; and
store (a) a third pointer to a third starting memory address corresponding to a third memory location of the third subsection of the sparsity matrix and (b) a fourth pointer to a fourth starting memory address corresponding to a fourth memory location of the fourth subsection of the sparsity matrix in the pointer array in the memory.

20. A method to store multi-dimensional data, the method comprising:
allocating, by executing an instruction with one or more processors, part of memory to store a sparsity matrix; and
partitioning, by executing an instruction with the one or more processors, the sparsity matrix into a first storage element and a second storage element;
storing the first storage element at a first memory location in the memory and the second storage element at a second memory location in the memory, the first storage element being selectively executable independent from the second storage element;
storing a pointer array including (1) a first pointer to a first starting memory address corresponding to the first memory location of the first storage element in the memory and (2) a second pointer to a second starting memory address corresponding to the second memory location of the second storage element in the memory the pointer array to facilitate selectively accessing the first storage element and the second storage element in the memory; and
storing a pointer for the pointer array into the memory.

\* \* \* \* \*